United States Patent
Keen et al.

(10) Patent No.: US 7,587,733 B2
(45) Date of Patent: Sep. 8, 2009

(54) AIRCRAFT IN-FLIGHT ENTERTAINMENT SYSTEM PROVIDING WEATHER INFORMATION AND ASSOCIATED METHODS

(75) Inventors: Robert M. Keen, Malabar, FL (US); Scott D. Easterling, Malabar, FL (US); Glenn S. Latta, Melbourne, FL (US); Jeffrey A. Frisco, Palm Bay, FL (US)

(73) Assignee: LiveTV, LLC, Melbourne, FL (US)

( * ) Notice: Subject to any disclaimer, the term of this patent is extended or adjusted under 35 U.S.C. 154(b) by 958 days.

(21) Appl. No.: 10/429,115

(22) Filed: May 2, 2003

(65) Prior Publication Data
US 2003/0233658 A1  Dec. 18, 2003

Related U.S. Application Data

(63) Continuation-in-part of application No. 09/544,883, filed on Apr. 7, 2000, now Pat. No. 6,748,597.

(51) Int. Cl.
*H04N 7/18* (2006.01)
(52) U.S. Cl. .......................................... 725/76; 725/77
(58) Field of Classification Search .................... 725/76
See application file for complete search history.

(56) References Cited

U.S. PATENT DOCUMENTS

| 4,112,818 A | 9/1978 | Garehime, Jr. ............. 89/41 TV |
| 4,413,263 A | 11/1983 | Amitay et al. ............... 343/756 |
| 4,584,603 A * | 4/1986 | Harrison ...................... 725/76 |
| 4,604,624 A | 8/1986 | Amitay et al. ............... 342/361 |
| 4,644,845 A | 2/1987 | Garehime, Jr. ............. 89/41.05 |
| 4,647,980 A | 3/1987 | Steventon et al. ........... 358/254 |
| 4,816,828 A | 3/1989 | Feher ......................... 340/945 |
| 4,831,438 A | 5/1989 | Bellman, Jr. et al. ........ 358/108 |
| 4,835,604 A | 5/1989 | Kondo et al. .................. 358/86 |
| 4,866,439 A | 9/1989 | Kraus ......................... 340/945 |
| 4,896,209 A | 1/1990 | Matsuzaki et al. ............ 358/86 |
| 4,975,696 A | 12/1990 | Salter, Jr. et al. ............ 340/973 |
| 5,027,124 A | 6/1991 | Fitzsimmons et al. ....... 342/362 |
| 5,055,660 A | 10/1991 | Bertagna et al. ............. 235/472 |

(Continued)

FOREIGN PATENT DOCUMENTS

EP            0557058          8/1993

(Continued)

OTHER PUBLICATIONS

Nauman, *Satellite radios will let drivers take listening formats everywhere*, Jun. 22, 2000, downloaded from www.auto.com.

(Continued)

*Primary Examiner*—Vivek Srivastava
*Assistant Examiner*—Mushfikh Alam
(74) *Attorney, Agent, or Firm*—Allen, Dyer, Doppelt, Milbrath & Gilchrist, P.A.

(57) ABSTRACT

An aircraft in-flight entertainment system includes a satellite weather information receiver receiving a weather related programming channel from a satellite, and at least one passenger display connected to the satellite weather information receiver for displaying weather related information corresponding to a selected geographic area. A passenger control unit is associated with each passenger display for selecting the geographic area.

35 Claims, 27 Drawing Sheets

U.S. PATENT DOCUMENTS

| | | | |
|---|---|---|---|
| 5,123,015 A | 6/1992 | Brady, Jr. et al. | 370/112 |
| 5,214,505 A | 5/1993 | Rabowsky et al. | 358/86 |
| 5,220,419 A | 6/1993 | Sklar et al. | 358/86 |
| 5,283,643 A | 2/1994 | Fujimoto | 348/143 |
| 5,289,272 A | 2/1994 | Rabowsky et al. | 348/8 |
| 5,309,167 A | 5/1994 | Cluniat et al. | 343/840 |
| 5,311,302 A | 5/1994 | Berry et al. | 348/14 |
| 5,459,469 A | 10/1995 | Schuchman et al. | 342/37 |
| 5,524,272 A | 6/1996 | Podowski et al. | 455/3.2 |
| 5,555,466 A | 9/1996 | Scribner et al. | 348/8 |
| 5,568,484 A | 10/1996 | Margis | 370/85.5 |
| 5,600,365 A | 2/1997 | Kondo et al. | 348/8 |
| 5,610,822 A | 3/1997 | Murphy | 364/449.5 |
| 5,617,108 A | 4/1997 | Silinsky et al. | 343/786 |
| 5,617,331 A | 4/1997 | Wakai et al. | 364/514 A |
| 5,649,318 A | 7/1997 | Lusignan | 455/3.2 |
| 5,678,171 A | 10/1997 | Toyama et al. | 455/3.2 |
| 5,742,336 A | 4/1998 | Lee | 348/144 |
| 5,745,159 A | 4/1998 | Wax et al. | 348/8 |
| 5,760,819 A | 6/1998 | Sklar et al. | 348/8 |
| 5,790,175 A | 8/1998 | Sklar et al. | 348/8 |
| 5,798,458 A | 8/1998 | Monroe | 73/587 |
| 5,801,751 A | 9/1998 | Sklar et al. | 348/8 |
| 5,808,660 A | 9/1998 | Sekine et al. | 348/8 |
| 5,808,661 A | 9/1998 | Infiesto et al. | 348/14 |
| 5,883,586 A | 3/1999 | Tran et al. | 340/945 |
| 5,884,219 A | 3/1999 | Curtwright et al. | 701/213 |
| 5,907,827 A | 5/1999 | Fang et al. | 704/503 |
| 5,929,895 A | 7/1999 | Berry et al. | 348/8 |
| 5,953,429 A | 9/1999 | Wakai et al. | 381/77 |
| 5,966,422 A * | 10/1999 | Dafni et al. | 378/9 |
| 5,966,442 A | 10/1999 | Sachdev | 380/10 |
| 5,973,722 A | 10/1999 | Wakai et al. | 348/8 |
| 5,990,928 A | 11/1999 | Sklar et al. | 348/8 |
| 5,999,882 A | 12/1999 | Simpson et al. | 702/3 |
| 6,009,356 A | 12/1999 | Monroe | 701/14 |
| 6,009,465 A | 12/1999 | Decker et al. | 709/219 |
| 6,014,381 A | 1/2000 | Troxel et al. | 370/395 |
| 6,014,606 A * | 1/2000 | Tu | 701/200 |
| 6,047,165 A | 4/2000 | Wright et al. | 455/66 |
| 6,058,288 A * | 5/2000 | Reed et al. | 455/3.06 |
| 6,092,008 A | 7/2000 | Bateman | 701/14 |
| 6,131,119 A | 10/2000 | Fukui | 709/224 |
| 6,163,338 A | 12/2000 | Johnson et al. | 348/148 |
| 6,246,320 B1 | 6/2001 | Monroe | 340/506 |
| 6,249,913 B1 * | 6/2001 | Galipeau et al. | 725/76 |
| 6,253,064 B1 | 6/2001 | Monroe | 455/66 |
| 6,264,135 B1 | 7/2001 | Dacosta | 244/1 R |
| 6,266,815 B1 | 7/2001 | Shen et al. | 725/76 |
| 6,314,370 B1 * | 11/2001 | Curtright | 701/213 |
| 6,347,216 B1 | 2/2002 | Marko et al. | 455/12.1 |
| 6,499,027 B1 | 12/2002 | Weinberger | 704/4 |
| 6,507,952 B1 | 1/2003 | Miller et al. | 725/76 |
| 6,545,722 B1 * | 4/2003 | Schultheiss et al. | 348/552 |
| 6,810,527 B1 * | 10/2004 | Conrad et al. | 725/76 |
| 7,236,100 B2 * | 6/2007 | Obradovich et al. | 340/905 |

FOREIGN PATENT DOCUMENTS

| | | |
|---|---|---|
| EP | 0653887 | 5/1995 |
| FR | 2652701 | 4/1991 |
| JP | 06292038 | 10/1994 |
| WO | 98/11686 | 3/1998 |

OTHER PUBLICATIONS

Frequently Asked Questions and news releases, 2000, Boeing, downloaded from www.boeing.com.

*You say you want a revolution?*, 2000, Sirius Satellite Radio Inc., downloaded from www.cdradio.com on Oct. 27, 2000.

XM Satellite Radio, page describing how the system works, downloaded from www.xmradio.com on Oct. 27, 2000.

Product information and press releases on LiveTV downloaded from www.ifetv.com on Oct. 27, 2000.

News, about page, and product information downloaded from www.waea.com on Oct. 27, 2000.

* cited by examiner

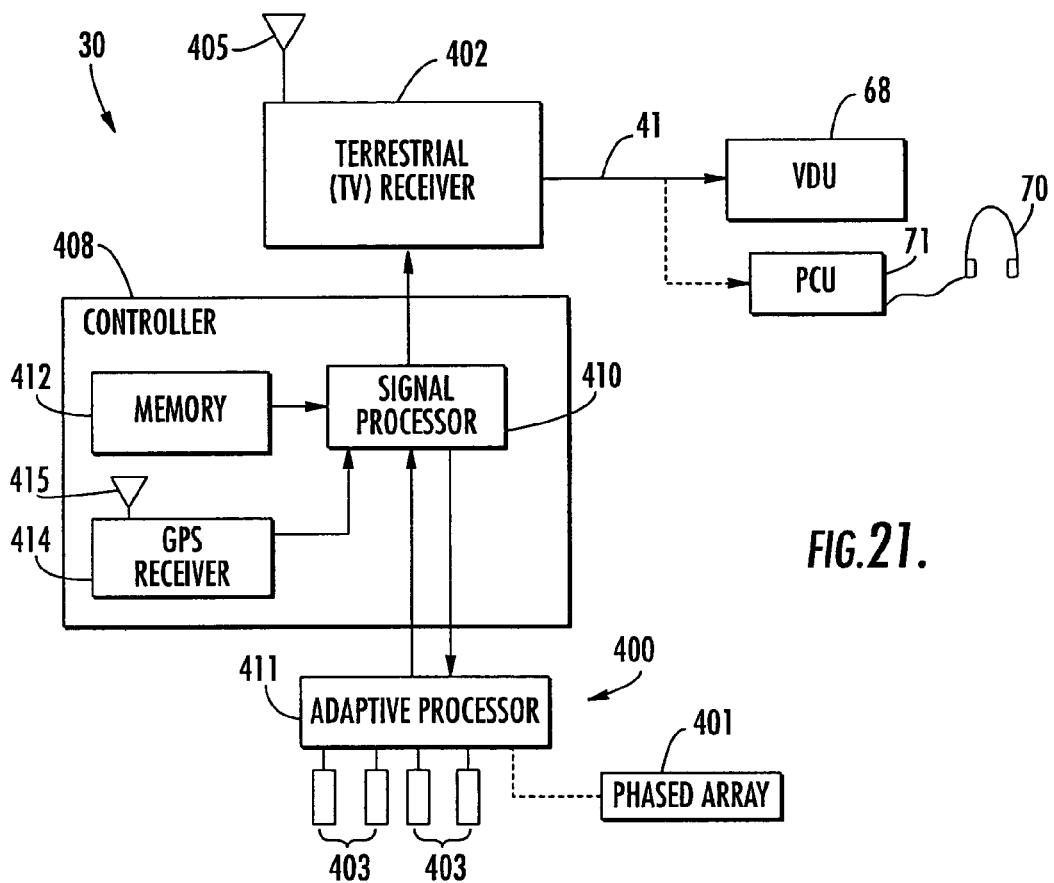
FIG.21.
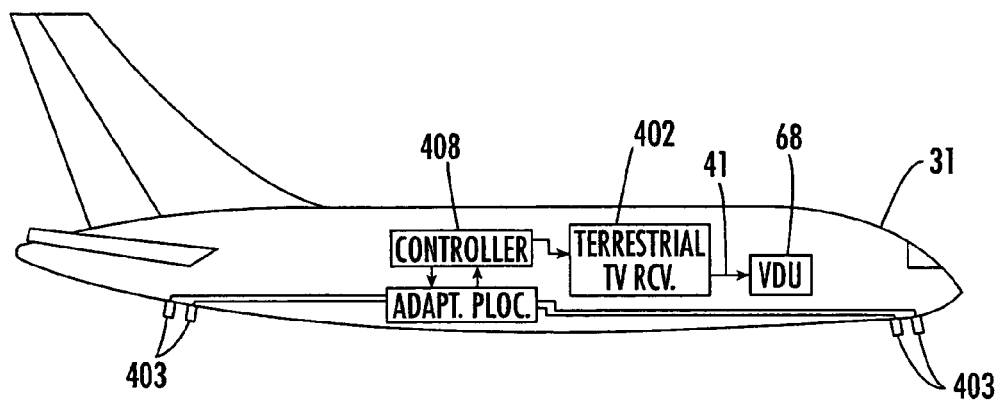
FIG.22.
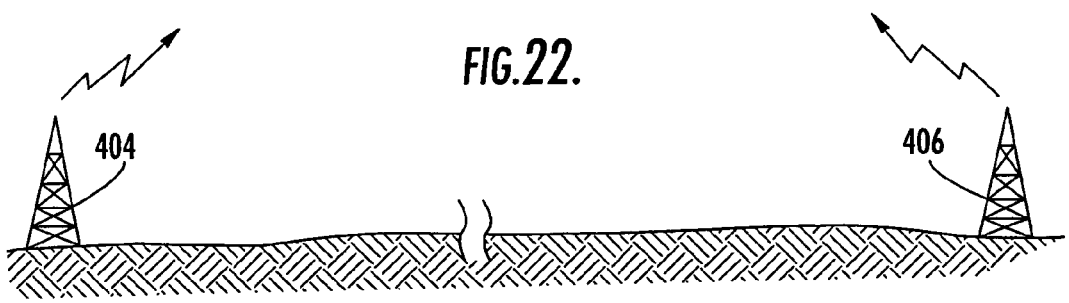

AIRCRAFT IN-FLIGHT ENTERTAINMENT SYSTEM PROVIDING WEATHER INFORMATION AND ASSOCIATED METHODS

RELATED APPLICATION

The present application is a continuation-in-part of U.S. patent application Ser. No. 09/544,883 filed Apr. 7, 2000, now U.S. Pat. No. 6,748,597, the entire contents of which is incorporated herein by reference.

FIELD OF THE INVENTION

The present invention relates to the field of aircraft systems, and more particularly, to an aircraft system providing passenger entertainment and aircraft surveillance.

BACKGROUND OF THE INVENTION

Commercial aircraft carry millions of passengers each year. For relatively long international flights, wide-body aircraft are typically used. These aircraft include multiple passenger aisles and have considerably more space than typical so-called narrow-body aircraft. Narrow-body aircraft carry fewer passengers shorter distances, and include only a single aisle for passenger loading and unloading. Accordingly, the available space for ancillary equipment is somewhat limited on a narrow-body aircraft.

Wide-body aircraft may include full audio and video entertainment systems for passenger enjoyment during relatively long flights. Typical wide-body aircraft entertainment systems may include cabin displays, or individual seatback displays. Movies or other stored video programming is selectable by the passenger, and payment is typically made via a credit card reader at the seat. For example, U.S. Pat. No. 5,568,484 to Margis discloses a passenger entertainment system with an integrated telecommunications system. A magnetic stripe credit card reader is provided at the telephone handset, and processing to approve the credit card is performed by a cabin telecommunications unit.

In addition to prerecorded video entertainment, other systems have been disclosed including a satellite receiver for live television broadcasts, such as disclosed in French Patent No. 2,652,701 and U.S. Pat. No. 5,790,175 to Sklar et al. The Sklar et al patent also discloses such a system including an antenna and its associated steering control for receiving both RHCP and LHCP signals from direct broadcast satellite (DBS) services. The video signals for the various channels are then routed to a conventional video and audio distribution system on the aircraft which distributes live television programming to the passengers.

In addition, U.S. Pat. No. 5,801,751 also to Sklar et al. addresses the problem of an aircraft being outside of the range of satellites, by storing the programming for delayed playback, and additionally discloses two embodiments—a full system for each passenger and a single channel system for the overhead monitors for a group of passengers. The patent also discloses steering the antenna so that it is locked onto RF signals transmitted by the satellite. The antenna steering may be based upon the aircraft navigation system or a GPS receiver along with inertial reference signals.

A typical aircraft entertainment system for displaying TV broadcasts may include one or more satellite antennas, headend electronic equipment at a central location in the aircraft, a cable distribution network extending throughout the passenger cabin, and electronic demodulator and distribution modules spaced within the cabin for different groups of seats. Many systems require signal attenuators or amplifiers at predetermined distances along the cable distribution network. In addition, each passenger seat may include an armrest control and seatback display. In other words, such systems may be relatively heavy and consume valuable space on the aircraft. Space and weight are especially difficult constraints for a narrow-body aircraft.

Published European Patent Application No. 557,058, for example, discloses a video and audio distribution system for an aircraft wherein the analog video signals are modulated upon individual RF carriers in a relatively low frequency range, and digitized audio signals, including digitized data, are modulated upon an RF carrier of a higher frequency to avoid interference with the modulated video RF carriers. All of the video and audio signals are carried by coaxial cables to area distribution boxes. Each area distribution box, in turn, provides individual outputs to its own group of floor distribution boxes. Each output line from a floor distribution box is connected to a single line of video seat electronic boxes (VSEB). The VSEB may service up to five or more individual seats. At each seat there is a passenger control unit and a seat display unit. Each passenger control unit includes a set of channel select buttons and a pair of audio headset jacks. Each display unit includes a video tuner that receives video signals from the VSEB and controls a video display.

A typical cable distribution network within an aircraft may be somewhat similar to a conventional coaxial cable TV system. For example, U.S. Pat. No. 5,214,505 to Rabowsky et al. discloses an aircraft video distribution system including amplifiers, taps and splitters positioned at mutually distant stations and with some of the stations being interconnected by relatively long lengths of coaxial cable. A variable equalizer is provided at points in the distribution system to account for different cable losses at different frequencies. The patent also discloses microprocessor-controlled monitoring and adjustment of various amplifiers to control tilt, that is, to provide frequency slope compensation. Several stations communicate with one another by a separate communication cable or service path independent of the RF coaxial cable. The patent further discloses maintenance features including reporting the nature and location of any failure or degradation of signals to a central location for diagnostic purposes.

There are various systems that provide location specific data to a user. For instance, U.S. Pat. No. 5,898,680 to Johnstone et al. discloses a satellite based digital broadcast system that provides digital maps and other types of data. Each user has a system equipped with a GPS receiver for determining its position. Based on the user's position, the system converts general data to location specific data tailored to the needs of the user. The general data may include a top level weather map covering a wide geographic region around the user, and the location specific data may include a more detailed weather map covering the geographic region in the immediate vicinity of the user, for example. The system may be carried by a mobile platform, such as an aircraft.

In addition, XM Satellite Radio and Baron Services have teamed together to provide graphical weather services to mobile platforms, including aircraft. Barron Services will provide severe weather detection, storm tracking capability and radar information over XM's satellite system. Unfortunately, these weather information systems are separate, standalone systems. That is, they do not share any resources with any of the other systems on the aircraft. This type of configuration negatively effects the limited space and weight constraints, particularly for a narrow-body aircraft.

SUMMARY OF THE INVENTION

In view of the foregoing background, an object of the present invention is to provide a combined weather information system and an in-flight entertainment system.

This and other objects, advantages and features in accordance with the present invention are provided by an aircraft in-flight entertainment system comprising a satellite receiver receiving at least one weather related programming channel from at least one satellite, and a plurality of passenger displays connected to the satellite receiver for displaying weather related information corresponding to selected geographic areas. The in-flight entertainment system preferably further comprises a plurality of passenger control units. Each passenger control unit may be associated with a respective passenger display for selecting the geographic area.

Each passenger control unit may comprise an input circuit, such as an alpha-numeric keypad, for selecting the geographic area. The selected geographic area may be a final destination of the passenger, and consequently, the passenger is able to obtain current weather related information for this particular area. The geographic area may be selected by entering at least one of a city name, a zip code and an area code. A default position for the selected geographic area may be a current location of the aircraft, for example. The current location of the aircraft may be provided by a positioning determining system, such as a GPS receiver.

At least one processor is preferably associated with the satellite receiver and the plurality of passenger displays. The at least one processor determines the weather related information corresponding to each selected geographic area. The at least one processor preferably compares information identifying the selected geographic area with information provided by the at least one weather related programming channel.

The in-flight entertainment system may further comprise a map image storage device connected to the at least one processor for storing a plurality of maps. The weather related information displayed on each respective passenger display may thus include a map corresponding to the selected geographic area.

The in-flight entertainment system further includes a plurality of signal distribution devices connecting the satellite receiver to the plurality of passenger displays. The at least one processor may comprise a plurality of processors, with each processor preferably being included within a respective signal distribution device.

The satellite receiver may operate within a frequency range of about 1 to 3 GHz, for example. The satellite providing the weather related programming channel may thus be a Sirius Satellite Radio satellite, an XM Satellite Radio satellite, or a WorldSpace satellite.

Another aspect of the present invention is directed to a method for operating an aircraft inflight entertainment system comprising a satellite receiver, at least one passenger display connected to the satellite receiver, and at least one passenger control unit associated with the at least one passenger display. The method preferably comprises receiving at least one weather related programming channel from at least one satellite, selecting a geographic area, and displaying weather related information corresponding to the selected geographic area.

BRIEF DESCRIPTION OF THE DRAWINGS

FIG. 21 is a partial block diagram of another embodiment of an in-flight entertainment system with a terrestrial TV receiver in accordance with the invention.

FIG. 22 is a schematic diagram of an aircraft illustrating the adaptive antenna system illustrated in FIG. 21.

DETAILED DESCRIPTION OF THE PREFERRED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
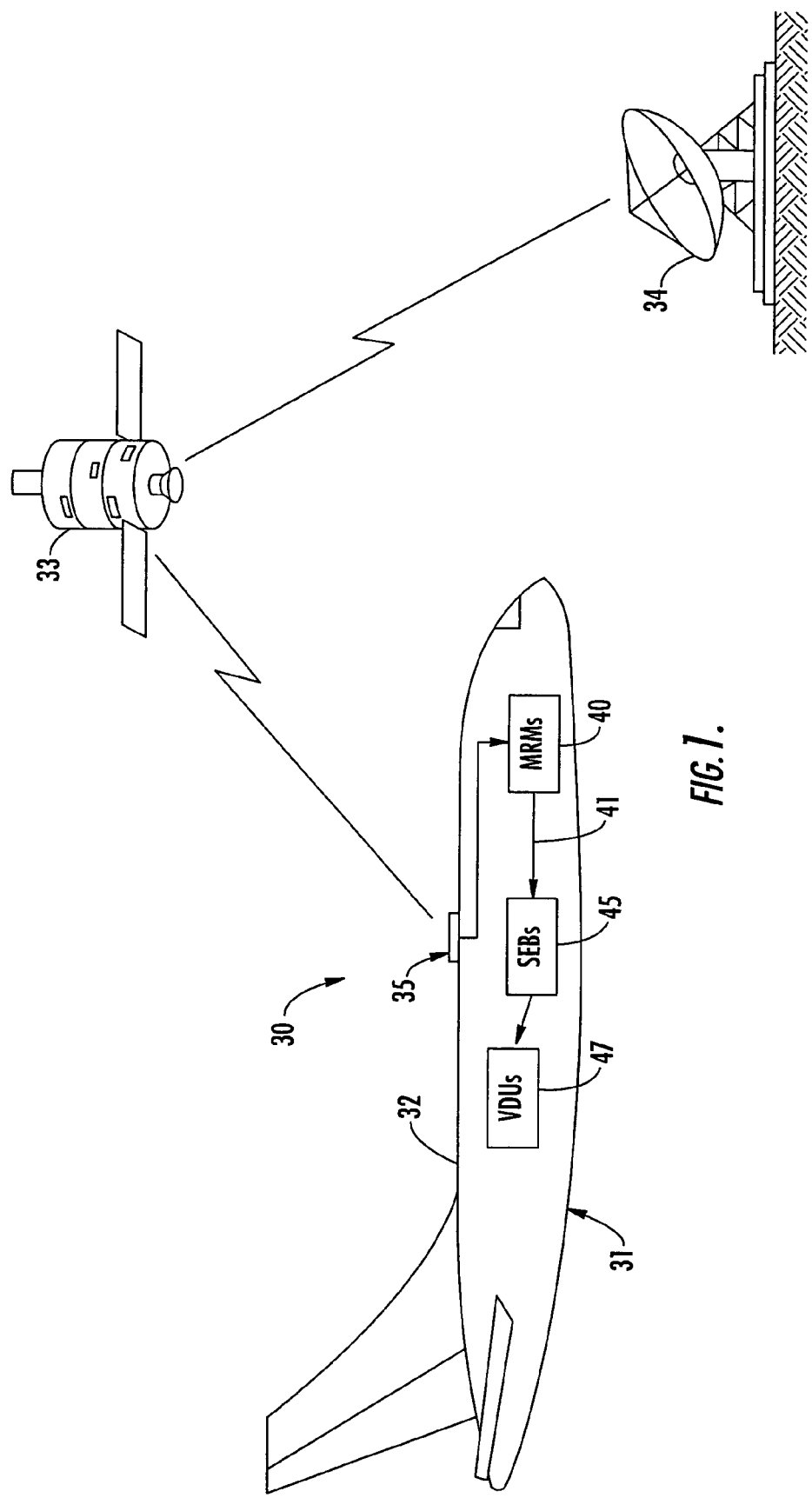
FIG. 1 is a schematic diagram of the overall components of the aircraft in-flight entertainment system in accordance with the present invention.

The major components of an in-flight entertainment system 30 in accordance with the present invention are initially described with reference to FIGS. 1 through 3. The system 30 receives television and/or audio broadcast signals via one or more geostationary satellites 33. The geostationary satellite 33 may be fed programming channels from a terrestrial station 34 as will be appreciated by those skilled in the art.

The in-flight entertainment system 30 includes an antenna system 35 to be mounted on the fuselage 32 of the aircraft 31. In addition, the system 30 also includes one or more multichannel receiver modulators (MRMs) 40, a cable distribution network 41, a plurality of seat electronic boxes (SEBs) 45 spaced about the aircraft cabin, and video display units (VDUs) 47 for the passengers and which are connected to the SEBs. In the illustrated embodiment, the system 30 receives, distributes, and decodes the DBS transmissions from the DBS satellite 33. In other embodiments, the system 30 may receive video or TV signals from other classes of satellites as will be readily appreciated by those skilled in the art.

The antenna system 35 delivers DBS signals to the MRMs 40 for processing. For example, each MRM 40 may include twelve DBS receivers and twelve video/audio RF modulators. The twelve receivers recover the digitally encoded multiplexed data for twelve television programs as will be appreciated by those skilled in the art.

Figure 2A:
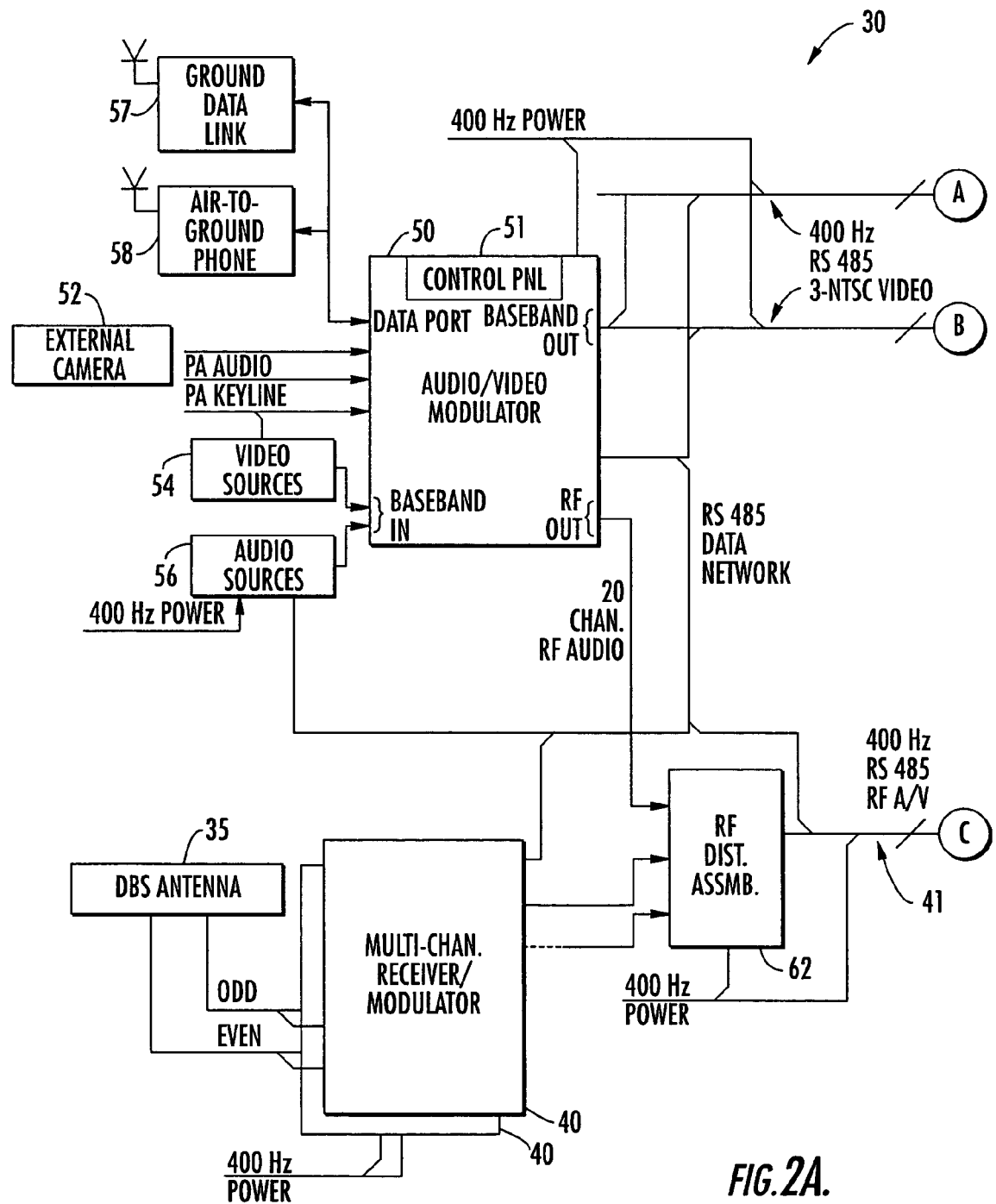
FIGS. 2A and 2B are a more detailed schematic block diagram of an embodiment of the in-flight entertainment system in accordance with the present invention.
Figure 2B:
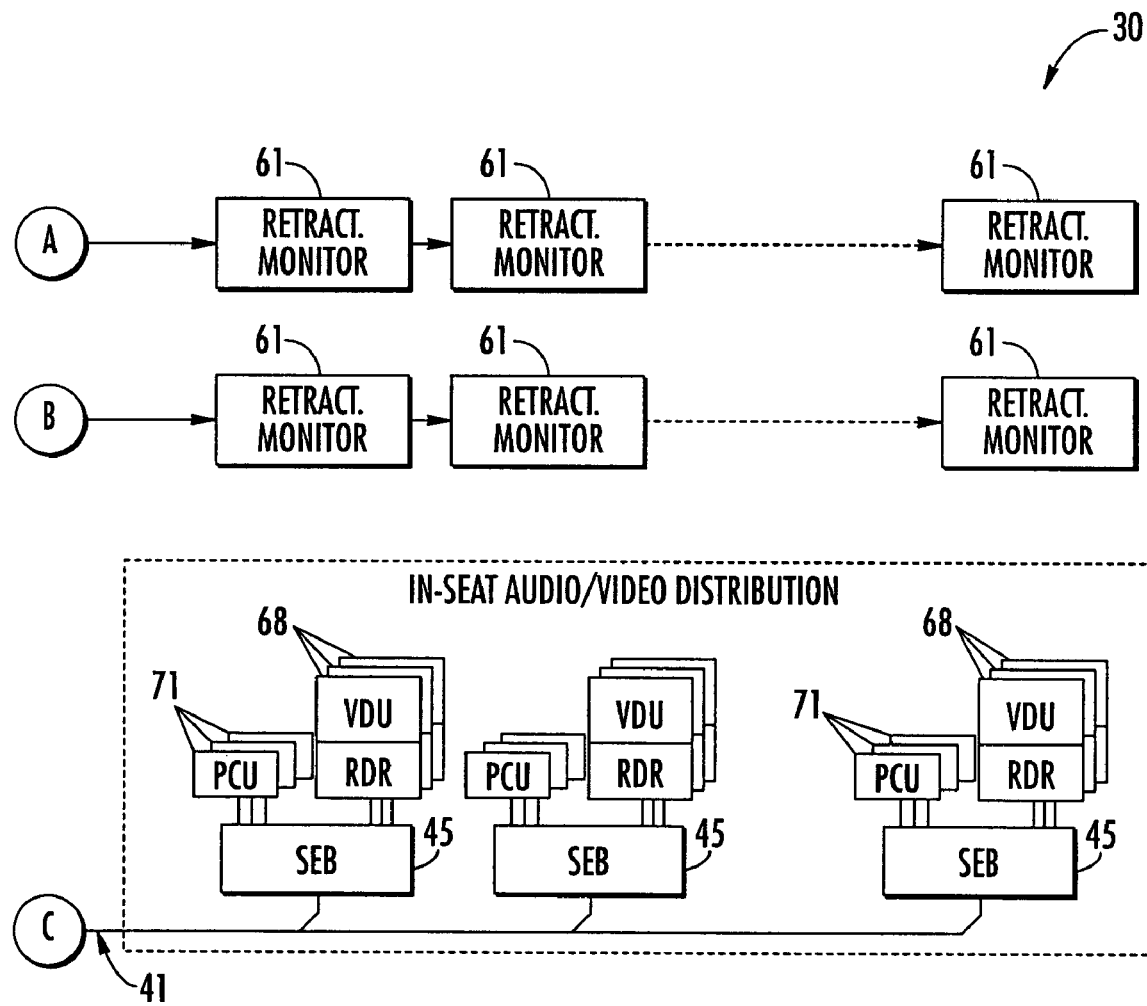

As shown in the more detailed schematic diagram of FIGS. 2A and 2B, an audio video modulator (AVM) 50 is connected to the MRMs 40, as well as a number of other inputs and outputs. The AVM 50 illustratively receives inputs from an external camera 52, as well as one or more other video sources 54, such as videotape sources, and receives signal inputs from one or more audio sources 56 which may also be prerecorded, for example. A PA keyline input and PA audio input are provided for passenger address and video address override. Audio for any receiver along with an associated keyline are provided as outputs from the MRM so that the audio may be broadcast over the cabin speaker system, for example, as will also be appreciated by those skilled in the art. In the illustrated embodiment, a control panel 51 is provided as part of the AVM 50. The control panel 51 not only permits control of the system, but also displays pertinent system information and permits various diagnostic or maintenance activities to be quickly and easily performed.

The AVM 50 is also illustratively coupled to a ground data link radio transceiver 57, such as for permitting downloading or uploading of data or programming information. The AVM 50 is also illustratively interfaced to an air-to-ground telephone system 58 as will be appreciated by those skilled in the art.

The AVM 50 illustratively generates a number of NTSC video outputs which may be fed to one or more retractable monitors 61 spaced throughout the cabin. Power is preferably provided by the aircraft 400 Hz AC power supply as will also be appreciated by those skilled in the art. Of course, in some embodiments, the retractable monitors may not be needed.

The MRMs 40 may perform system control, and status monitoring. An RF distribution assembly (RDA) 62 can be provided to combine signals from a number of MRMs, such as four, for example. The RDA 62 combines the MRM RF outputs to create a single RF signal comprising up to 48 audio/video channels, for example. The RDA 62 amplifies and distributes the composite RF signal to a predetermined number of zone cable outputs. Eight zones are typical for a typical narrow-body single-aisle aircraft 31. Depending on the aircraft, not all eight outputs may be used. Each cable will serve a zone of seatgroups 65 in the passenger cabin.

Figure 3:
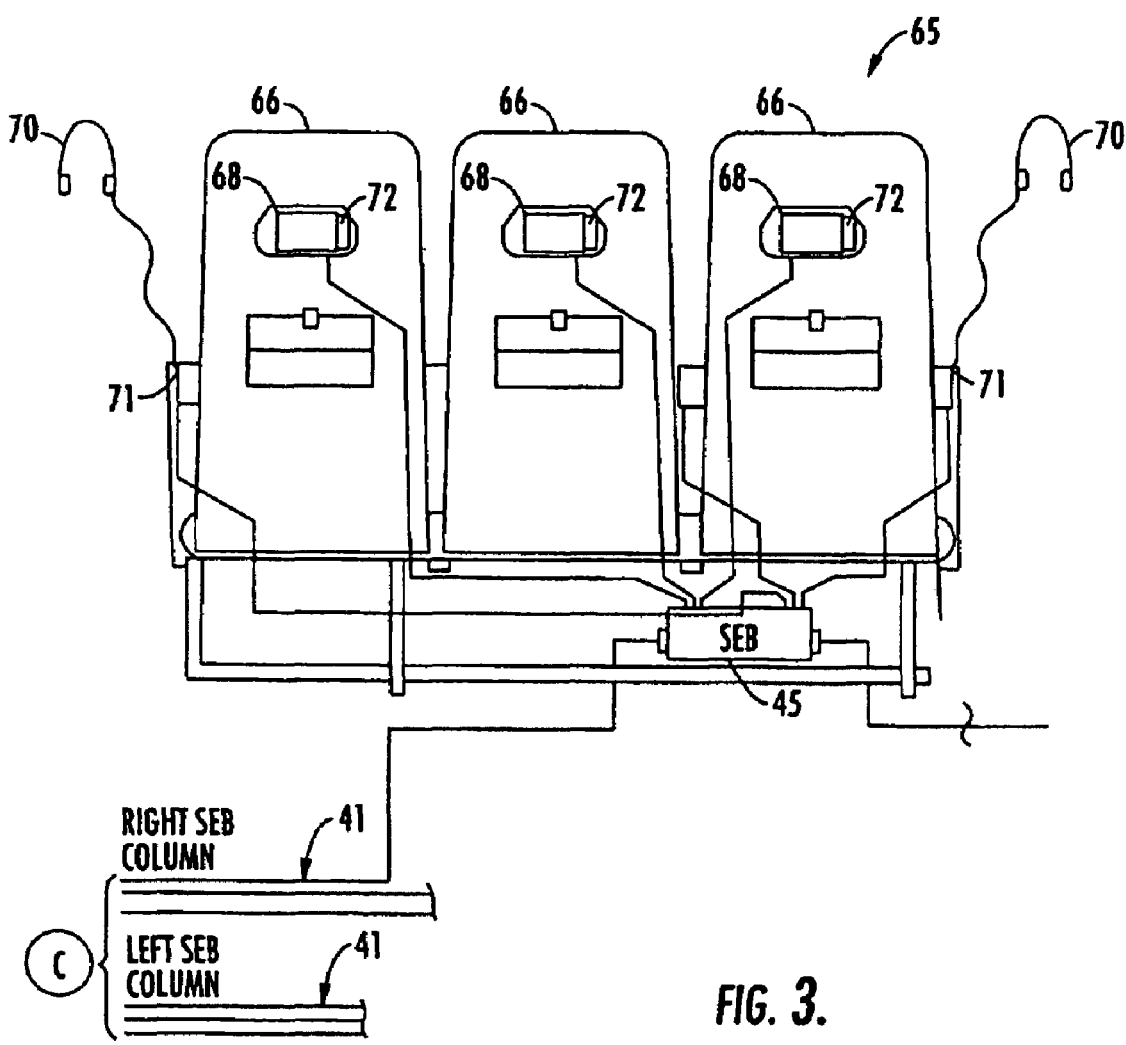
FIG. 3 is a schematic rear view of a seatgroup of the in-flight entertainment system of the invention.

Referring now more specifically to the lower portion of FIG. 2B and also to FIG. 3, distribution of the RF signals and display of video to the passengers is now further described. Each zone cable 41 feeds the RF signal to a group of contiguous seatgroups 65 along either the right or left hand side of the passenger aisle. In the illustrated embodiment, the seatgroup 65 includes three side-by-side seats 66, although this number may also be two for other types of conventional narrow-body aircraft.

The distribution cables 41 are connected to the-first SEB 45 in each respective right or left zone. The other SEBs 45 are daisy-chained together with seat-to-seat cables. The zone feed, and seat-to-seat cables preferably comprise an RF audio-video coaxial cable, a 400 cycle power cable, and RS 485 data wiring.

For each seat 66 in the group 65, the SEB 45 tunes to and demodulates one of the RF modulated audio/video channels. The audio and video are output to the passenger video display units (VDUs) 68 and headphones 70, respectively. The tuner channels are under control of the passenger control unit (PCU) 71, typically mounted in the armrest of the seat 66, and which also carries a volume control.

Each VDU 68 may be a flat panel color display mounted in the seatback. The VDU 68 may also be mounted in the aircraft bulkhead in other configurations as will be appreciated by those skilled in the art. The VDU 68 will also typically include associated therewith a user payment card reader 72. The payment card reader 72 may be a credit card reader, for example, of the type that reads magnetically encoded information from a stripe carried by the card as the user swipes the card through a slot in the reader as will be appreciated by those skilled in the art. In some embodiments, the credit card data may be processed on the aircraft to make certain processing decisions relating to validity, such as whether the card is expired, for example. As described in greater detail below, the payment card reader 72 may also be used as the single input required to activate the system for enhanced user convenience.

Having now generally described the major components of the in-flight entertainment system 30 and their overall operation, the description now is directed to several important features and capabilities of the system in greater detail. One such feature relates to flexibility or upgradability of the system as may be highly desirable for many airline carriers. In particular, the system 30 is relatively compact and relatively inexpensive so that it can be used on narrow-body aircraft 31, that is, single-aisle aircraft. Such narrow-body aircraft 31 are in sharp contrast to wide-body aircraft typically used on longer overseas flights and which can typically carry greater volumes and weight. The narrow-body aircraft 31 are commonly used on shorter domestic flights The system 30, for example, can be first installed to provide only audio. In addition, the first class passengers may be equipped with seat back VDUs 68, while the coach section includes only aisle mounted video screens. The important aspect that permits upgradability is that the full cable distribution system is installed initially to thereby have the capacity to handle the upgrades. In other words, the present invention permits upgrading and provides reconfiguration options to the air carrier for an in-flight entertainment system and while reducing downtime for such changes.

The cable distribution system is modeled after a conventional ground based cable TV system in terms of signal modulation, cabling, drops, etc. Certain changes are made to allocate the available channels, such as forty-eight, so as not to cause potential interference problems with other equipment aboard the aircraft 31 as will be appreciated by those skilled in the art. In addition, there are basically no active components along the cable distribution path that may fail, for example. The cable distribution system also includes zones of seatgroups 66. The zones provide greater robustness in the event of a failure. The zones can also be added, such as to provide full service throughout the cabin.

Figure 4:
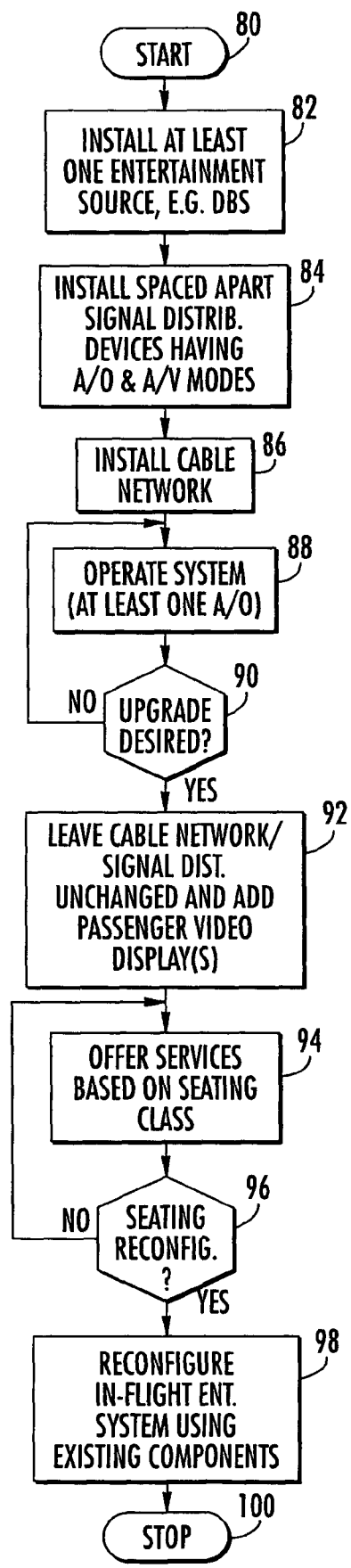
FIG. 4 is a flowchart for a first method aspect relating to the in-flight entertainment system of the invention.

Referring now additionally to the flow chart of FIG. 4, a method for installing and operating an aircraft in-flight entertainment system in accordance with the invention is now described. After the start (Block 80), the method preferably comprises installing at least one entertainment source on the aircraft at Block 82. The entertainment source may include a satellite TV source, such as provided by the DBS antenna system 35 and MRMs 40 described above. The method at Block 84 also preferably includes installing a plurality of spaced apart signal distribution devices, each generating audio signals for at least one passenger in an audio-only mode, and generating audio and video signals to at least one passenger in an audio/video mode. These devices may be the SEBs 45 described above as will be readily appreciated by those skilled in the art. The SEBs 45 include the capability for both audio and video when initially installed to thereby provide the flexibility for upgrading.

At Block 86 the cable network is installed on the aircraft 31 connecting the at least one entertainment source to the signal distribution devices. In other words, the MRMs 40 are connected to the SEBs 45 in the various equipped zones throughout the aircraft 31. Operating the aircraft in-flight entertainment system 30 at Block 88 with at least one predetermined signal distribution device in the audio-only mode, permits initial weight and cost savings since the VDUs 68, for example, may not need to be initially installed for all passengers as will be appreciated by those skilled in the art. For example, a carrier may initially decide to equip first class passengers with both video and audio entertainment options, while coach passengers are initially limited to audio only. Hence, the cost of the VDUs 68 for the coach passengers is initially deferred.

Installing the cabling 41 and SEBs 45 at one time will result in substantial time and labor savings as compared to a piecemeal approach to adding these components at a later time as needed. Accordingly, should an upgrade be desired at Block 90, this may be readily accomplished by connecting at least one VDU 68 to the at least one predetermined signal distribution device, or SEB 45, to operate in the audio/video mode and while leaving the cable network unchanged (Block 92). Accordingly, the downtime experienced by an air carrier is greatly reduced over other systems which require significant recabling and other difficult equipment installation operations for upgrading. The method is particularly advantageous for a single-aisle narrow-body aircraft 31 as shown in the illustrated embodiment, where cost effectiveness and low weight are especially important.

As noted above, the entertainment source may preferably comprise a DBS receiver. The step of later upgrading may further comprise leaving the at least one predetermined signal distribution device, such as the SEB 45, unchanged. The step of installing the cable network 41 may comprise installing coaxial cable, power cable and data cable throughout the aircraft as also described above. The step of later upgrading may include installing at least one VDU 68 in the aircraft 31, such as on backs of passenger seats 66.

Of course, the aircraft 31 in some embodiments may include different seating classes as will be appreciated by those skilled in the art. Accordingly, another important aspect of the invention relates to offering different entertainment services based upon the different seating classes at Block 94. In addition, the different seating classes may be reconfigurable, and the step of reconfiguring offered entertainment services may then be based upon reconfiguring of the seating classes. The offering of different entertainment services may comprise offering different packages of television channels, for example. In addition, the step of offering different entertainment services may comprise offering audio-only and audio/video modes of operation based upon seating classes.

Yet another aspect of the invention relates to a method for operating an aircraft in-flight entertainment system 30 for an aircraft 31 when seating classes are reconfigured. Continuing down the flowchart of FIG. 4, this aspect of the method preferably comprises determining whether a reconfiguration is desired at Block 96, and reconfiguring offered entertainment services based upon reconfiguring of the seating classes at Block 98 before stopping at Block 100. For example, the step of offering different entertainment services may include offering different packages of television channels. Alternately, the step of offering different entertainment services may comprise offering audio-only and audio/video modes of operation based upon seating classes. In either case, the reconfiguring can be readily accomplished using the existing cable distribution network 41 and distribution devices, that is, SEBs 45 as will be appreciated by those skilled in the art.

The various upgrading and reconfiguring aspects of the in-flight entertainment system 30 can be performed in a reverse sequence than that illustrated in FIG. 4 and described above. of course, the upgrade steps may be practiced without the later reconfiguring steps as will be appreciated by those skilled in the art.

Figure 5:
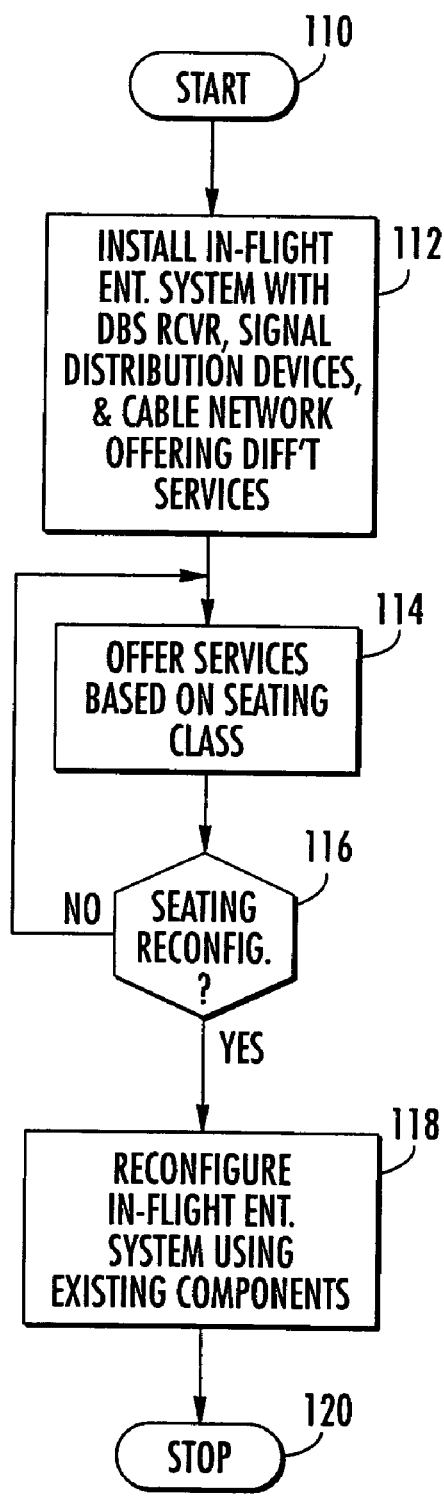
FIG. 5 is a flowchart for a second method aspect relating to the in-flight entertainment system of the invention.

To further illustrate the method aspects, the flowchart of FIG. 5 is directed to the subset of offering different services and later reconfiguring those services based upon reconfiguring seating. More particularly, from the start (Block 110), the in-flight entertainment system 30 is installed (Block 112)

and operated (Block 114) for offering different services based upon seating class, such as offering video to first class passengers, and offering only audio to non-first class passengers. If it is determined that the seating should be reconfigured at Block 116, then the in-flight entertainment system 30 can be readily reconfigured at Block 118 before stopping (Block 120).

Figure 6:
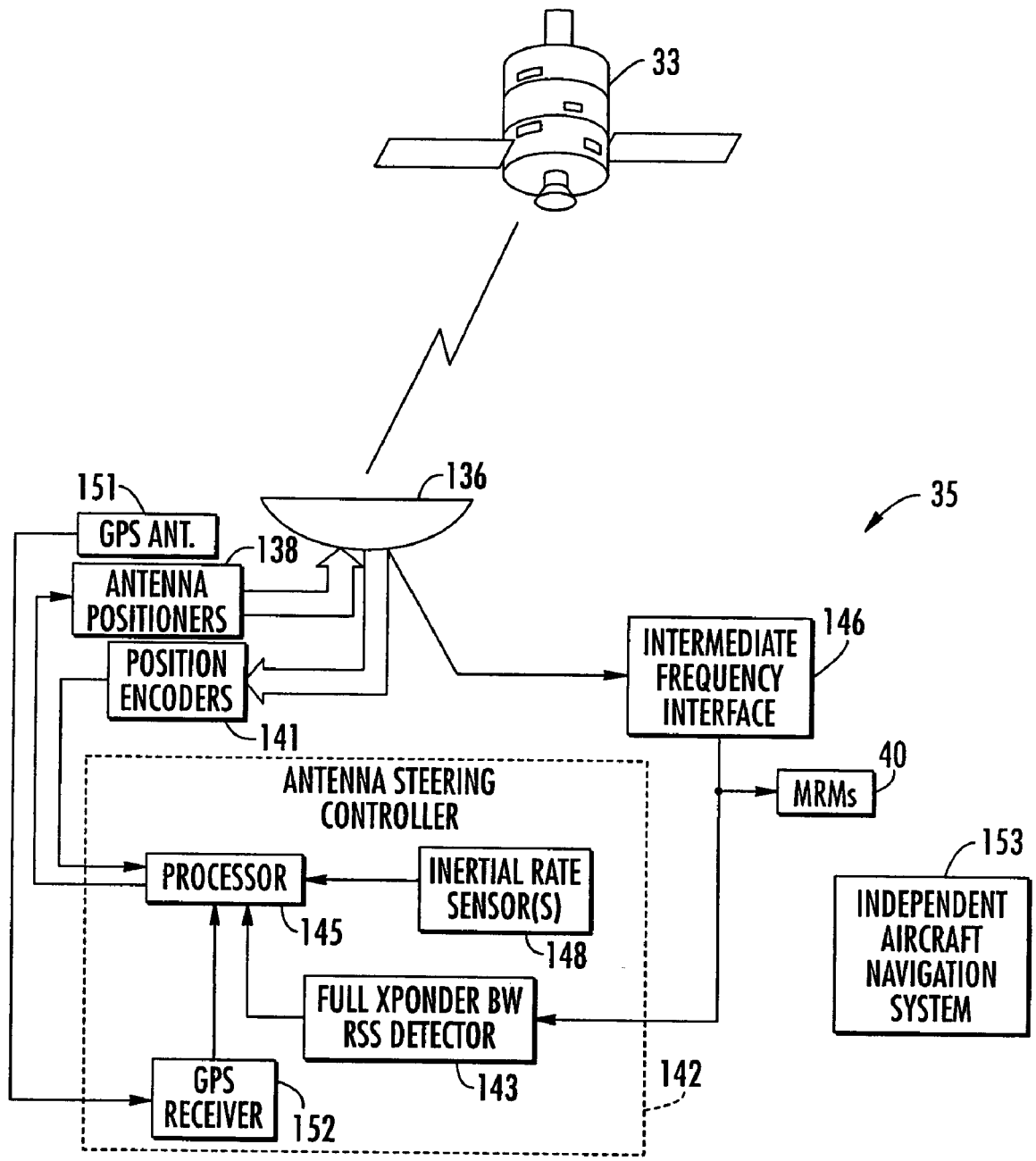
FIG. 6 is a more detailed schematic block diagram of a first embodiment of an antenna-related portion of the in-flight entertainment system of the invention.
Figure 7:
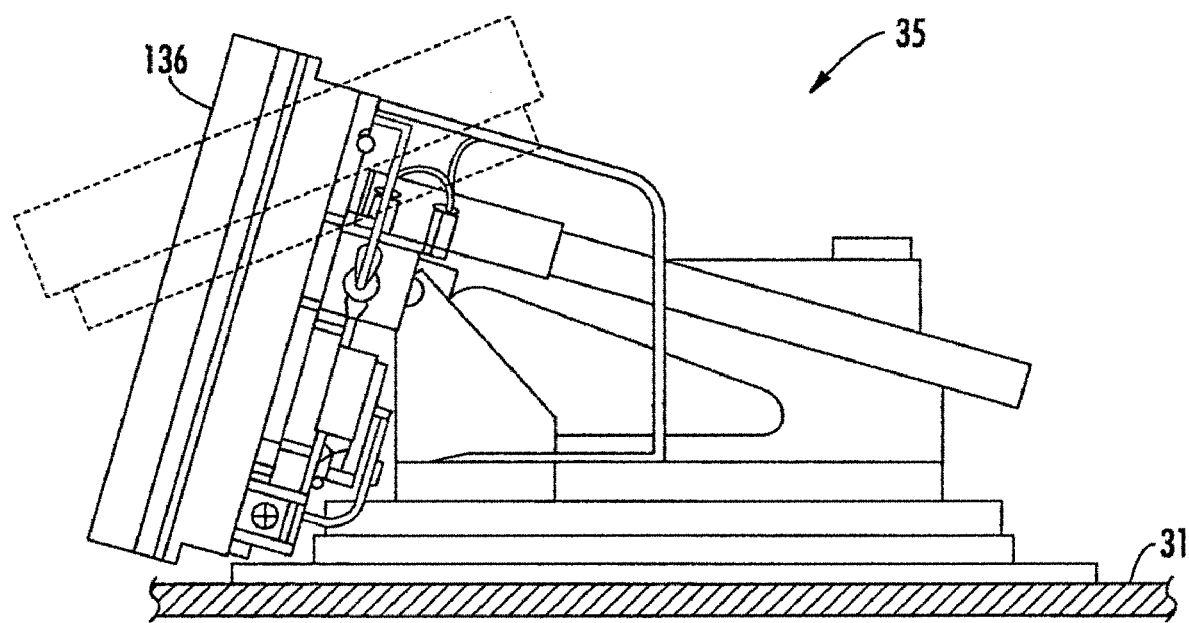
FIG. 7 is a side elevational view of the antenna mounted on the aircraft for the in-flight entertainment system of the invention.

Turning now additionally to FIGS. 6 and 7, advantages and features of the antenna system 35 are now described in greater detail. The antenna system 35 includes an antenna 136 which may be positioned or steered by one or more antenna positioners 138 as will be appreciated by those skilled in the art. In addition, one or more position encoders 141 may also be associated with the antenna 136 to steer the antenna to thereby track the DBS satellite or satellites 33. Of course, a positioning motor and associated encoder may be provided together within a common housing, as will also be appreciated by those skilled in the art. In accordance with one significant advantage of the present invention, the antenna 136 may be steered using received signals in the relatively wide bandwidth of at least one DBS transponder.

More particularly, the antenna system 35 includes an antenna steering controller 142, which, in turn, comprises the illustrated full transponder bandwidth received signal detector 143. This detector 143 generates a received signal strength feedback signal based upon signals received from the full bandwidth of a DBS transponder rather than a single demodulated programming channel, for example. Of course, in other embodiments the same principles can be employed for other classes or types of satellites than the DBS satellites described herein by way of example.

In the illustrated embodiment, the detector 143 is coupled to the output of the illustrated intermediate frequency interface (IFI) 146 which converts the received signals to one or more intermediate frequencies for further processing by the MRMs 40 as described above and as will be readily appreciated by those skilled in the art. In other embodiments, signal processing circuitry, other than that in the IFT 146 may also be used to couple the received signal from one or more full satellite transponders to the received signal strength detector 143 as will also be appreciated by those skilled in the art.

A processor 145 is illustratively connected to the received signal strength detector 143 for controlling the antenna steering positioners 138 during aircraft flight and based upon the received signal strength feedback signal. Accordingly, tracking of the satellite or satellites 33 is enhanced and signal service reliability is also enhanced.

The antenna steering controller 142 may further comprise at least one inertial rate sensor 148 as shown in the illustrated embodiment, such as for roll, pitch or yaw as will be appreciated by those skilled in the art. The rate sensor 148 may be provided by one or more solid state gyroscopes, for example. The processor 145 may calibrate the rate sensor 148 based upon the received signal strength feedback signal.

The illustrated antenna system 35 also includes a global positioning system (GPS) antenna 151 to be carried by the aircraft fuselage 32. This may preferably be provided as part of an antenna assembly package to be mounted on the upper portion of the fuselage. The antenna assembly may also include a suitable radome, not shown, as will be appreciated by those skilled in the art. The antenna steering controller 142 also illustratively includes a GPS receiver 152 connected to the processor 145. The processor 145 may further calibrate the rate sensor 148 based upon signals from the GPS receiver as will be appreciated by those skilled in the art.

As will also be appreciated by those skilled in the art, the processor 145 may be a commercially available microprocessor operating under stored program control. Alternately, discrete logic and other signal processing circuits may be used for the processor 145. This is also the case for the other portions or circuit components described as a processor herein as will be appreciated by those skilled in the art. The advantageous feature of this aspect of the invention is that the full or substantially full bandwidth of the satellite transponder signal is processed for determining the received signal strength, and this provides greater reliability and accuracy for steering the antenna 136.

Another advantage of the antenna system 35 is that it may operate independently of the aircraft navigation system 153 which is schematically illustrated in the lower right hand portion of FIG. 6. In other words, the aircraft 31 may include an aircraft navigation system 153, and the antenna steering controller 142 may operate independently of this aircraft navigation system. Thus, the antenna steering may operate faster and without potential unwanted effects on the aircraft navigation system 153 as will be appreciated by those skilled in the art. In addition, the antenna system 35 is also particularly advantageous for a single-aisle narrow-body aircraft 31 where cost effectiveness and low weight are especially important.

Figure 8:
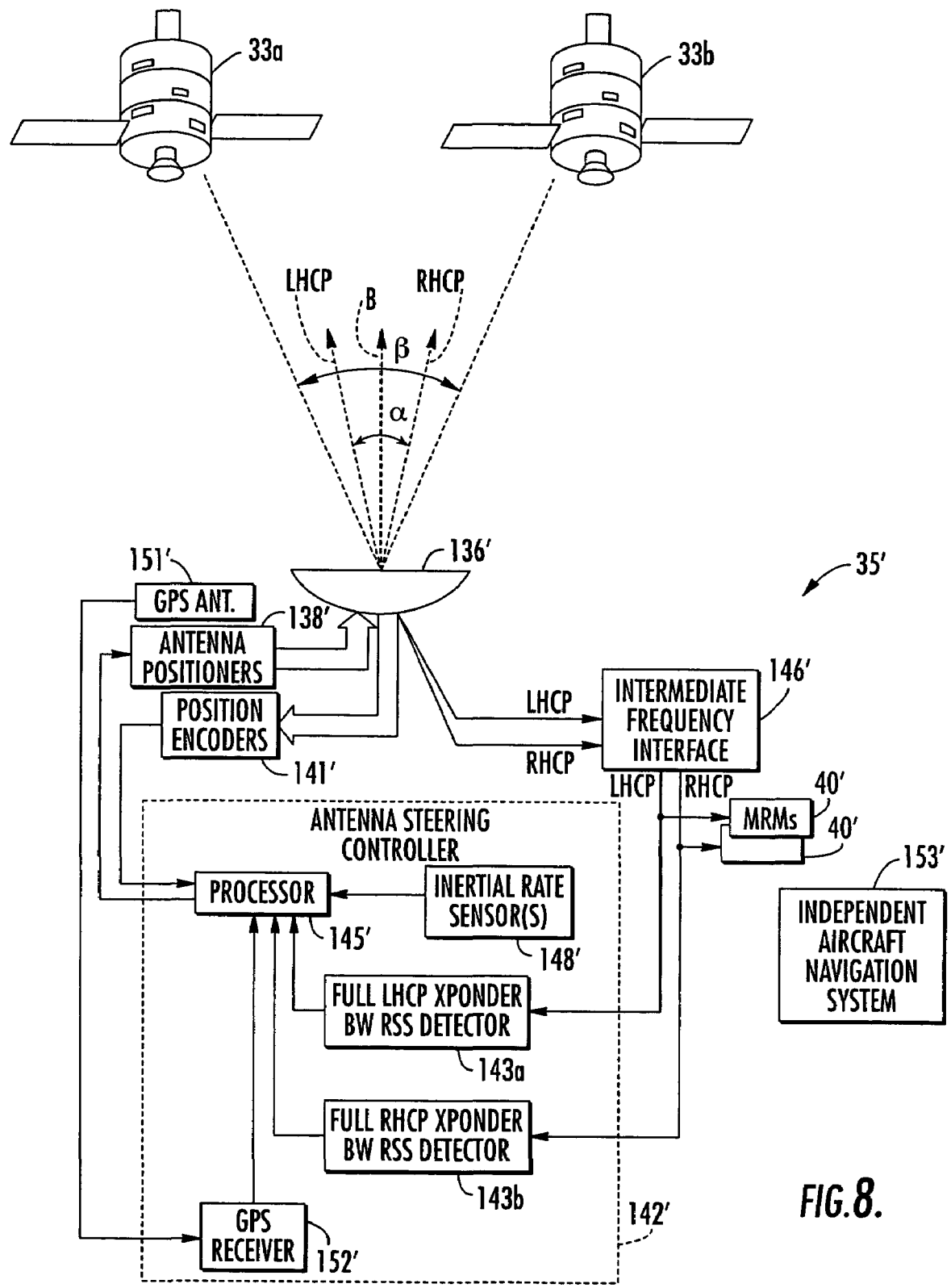
FIG. 8 is a more detailed schematic block diagram of a second embodiment of an antenna-related portion of the in-flight entertainment system of the invention.

Turning now additionally to FIG. 8, another embodiment of the antenna system 35' is now described which includes yet further advantageous features. This embodiment is directed to functioning in conjunction with the three essentially collocated geostationary satellites for the DIRECTV® DBS service, although the invention is applicable in other situations as well. For example, the DIRECTV® satellites may be positioned above the earth at 101 degrees west longitude and spaced 0.5 degrees from each other. Of course, these DIRECTV® satellites may also be moved from these example locations, and more than three satellites may be so collocated. Considered in somewhat broader terms, these features of the invention are directed to two or more essentially collocated geostationary satellites. Different circular polarizations are implemented for reused frequencies as will be appreciated by those skilled in the art.

In this illustrated embodiment, the antenna 136' is a multibeam antenna having an antenna boresight (indicated by reference B), and also defining right-hand circularly polarized (RHCP) and left-hand circularly polarized (LHCP) beams (designated RHCP and LHCP in FIG. 8) which are offset from the antenna boresight. Moreover, the beams RHCP, LHCP are offset from one another by a beam offset angle $\alpha$ which is greatly exaggerated in the figure for clarity. This beam offset angle $\alpha$ is less than the angle $\beta$ defined by the spacing defined by the satellites 33a, 33b. The transponder or satellite spacing angle $\beta$ is about 0.5 degrees, and the beam offset angle $\alpha$ is preferably less than 0.5 degrees, and may be about 0.2 degrees, for example.

The beam offset angle provides a squinting effect which allows the antenna 136' to be made longer and thinner than would otherwise be required, and the resulting shape is highly desirable for aircraft mounting as will be appreciated by those skilled in the art. The squinting also allows the antenna to be constructed to have additional signal margin when operating in rain, for example, as will also be appreciated by those skilled in the art.

The multi-beam antenna 136' may be readily constructed in a phased array form or in a mechanical form as will be appreciated by those skilled in the art without requiring further discussion herein. Aspects of similar antennas are disclosed in U.S. Pat. No. 4,604,624 to Amitay et al.; U.S. Pat. No. 5,617,108 to Silinsky et al.; and U.S. Pat. No. 4,413,263 also to Amitay et al.; the entire disclosures of which are incorporated herein by reference.

The processor 145' preferably steers the antenna 136' based upon received signals from at least one of the RHCP and LHCP beams which are processed via the IFI 146' and input into respective received signal strength detectors 143a, 143b of the antenna steering controller 142'. In one embodiment, the processor 145' steers the multi-beam antenna 136' based on a selected master one of the RHCP and LHCP beams and slaves the other beam therefrom.

In another embodiment, the processor 145' steers the multi-beam antenna 136' based on a predetermined contribution from each of the RHCP and LHCP beams. For example, the contribution may be the same for each beam. In other words, the steering or tracking may such as to average the received signal strengths from each beam as will be appreciated by those skilled in the art. As will also be appreciated by those skilled in the art, other fractions or percentages can also be used. Of course, the advantage of receiving signals from two different satellites 33a, 33b is that more programming channels may then be made available to the passengers.

The antenna system 35' may also advantageously operate independent of the aircraft navigation system 153'. The other elements of FIG. 8 are indicated by prime notation and are similar to those described above with respect to FIG. 6. Accordingly, these similar elements need no further discussion.

Another aspect of the invention relates to the inclusion of adaptive polarization techniques which may be used to avoid interference from other satellites. In particular, low earth orbit satellites (LEOS) are planned which may periodically be in position to cause interference with the signal reception by the in-flight entertainment system 30. Adaptive polarization techniques would also be desirable should assigned orbital slots for satellites be moved closer together.

Accordingly, the processor 145' may preferably be configured to perform adaptive polarization techniques to avoid or reduce the impact of such potential interference. Other adaptive polarization techniques may also be used. Suitable adaptive polarization techniques are disclosed, for example, in U.S. Pat. No. 5,027,124 to Fitzsimmons et al; U.S. Pat. No. 5,649,318 to Lusignan; and U.S. Pat. No. 5,309,167 to Cluniat et al. The entire disclosures of each of these patents is incorporated herein by reference. Those of skill in the art will readily appreciate the implementation of such adaptive polarization techniques with the in flight entertainment system 30 in accordance with the present invention without further discussion.

Figure 10:
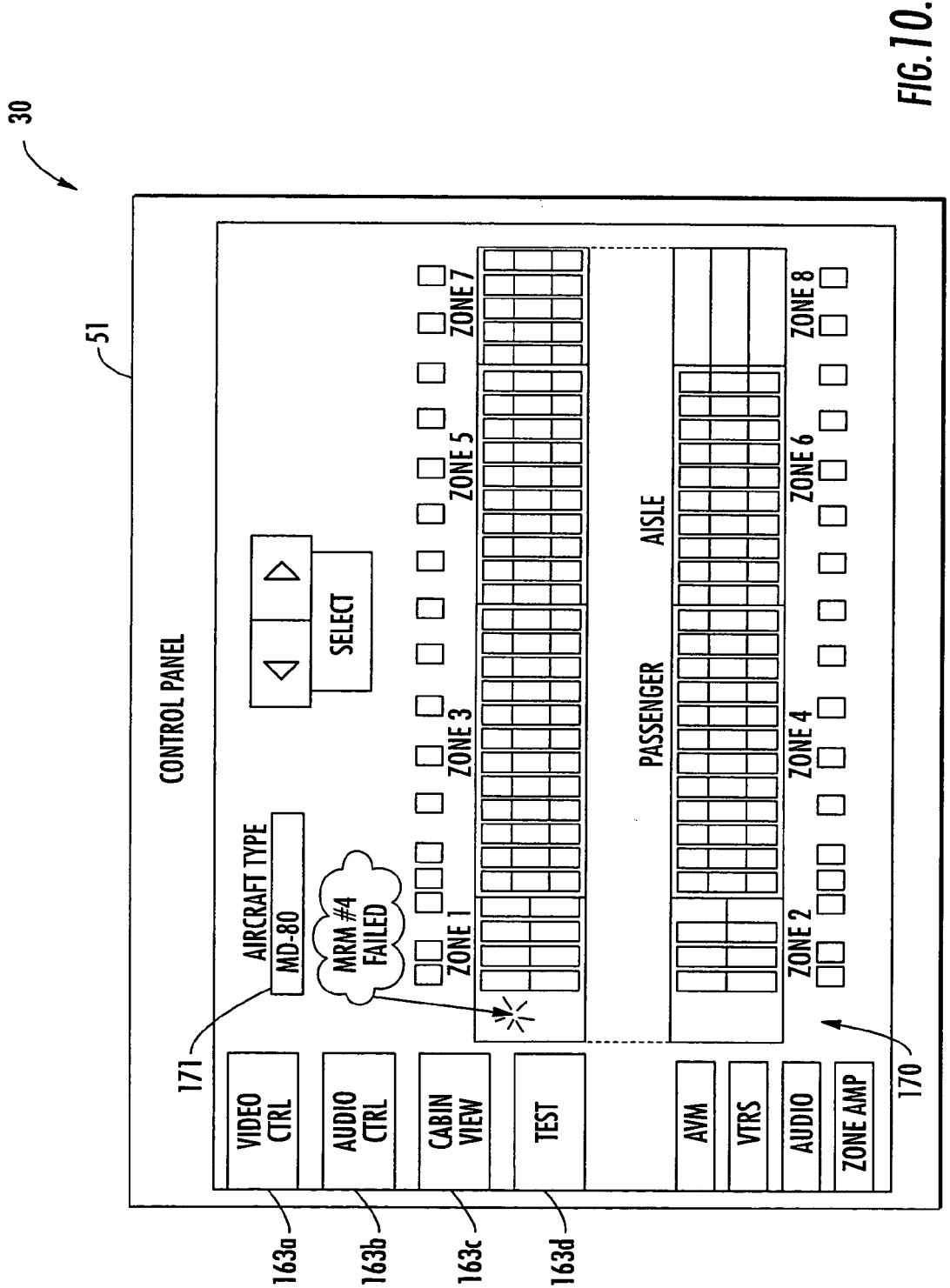
Figure 11:
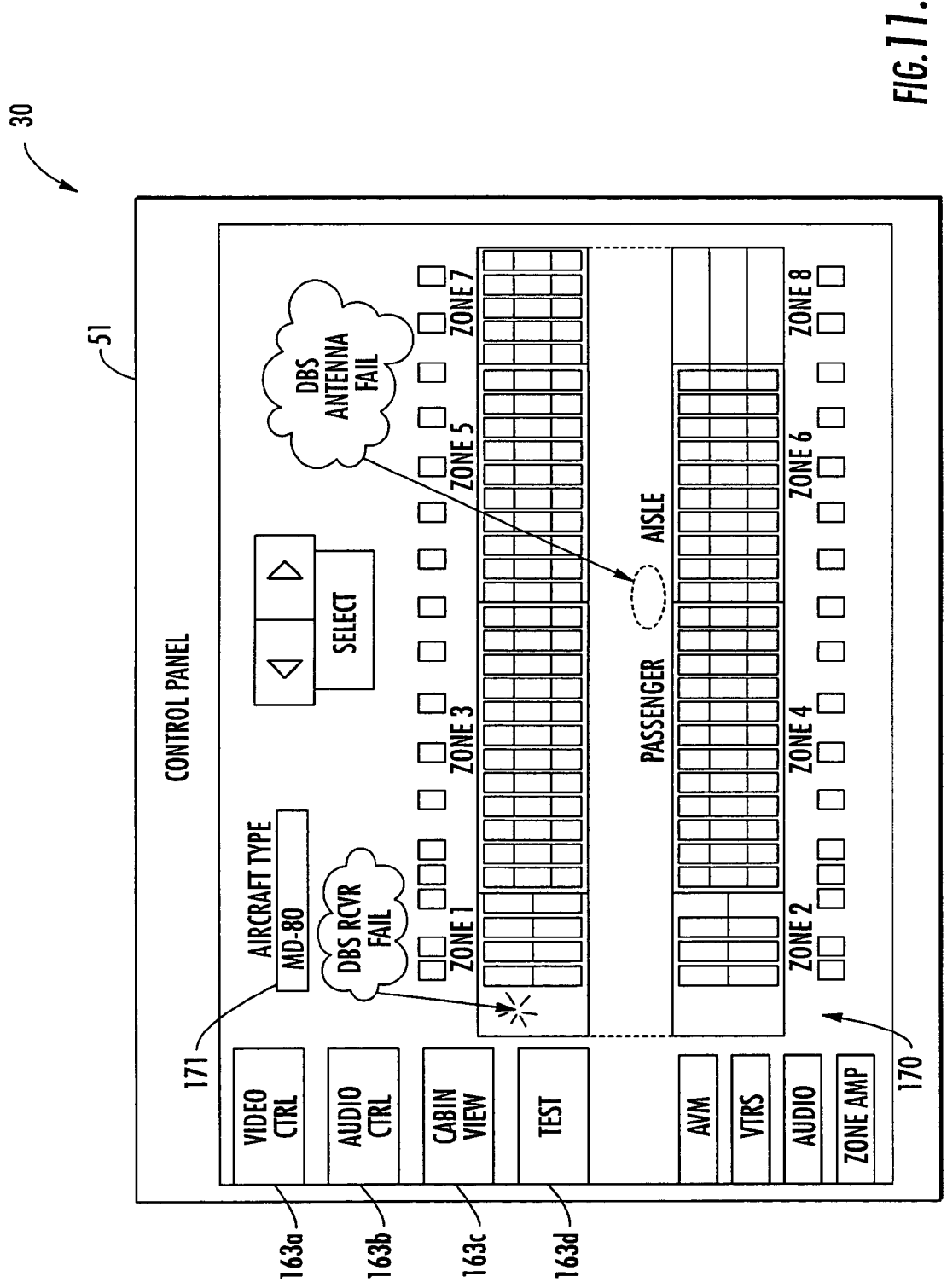

Other aspects and advantages of the in-flight entertainment system 30 of the present invention are now explained with reference to FIGS. 9-11. The system 30 advantageously incorporates a number of self-test or maintenance features. As will be appreciated by those skilled in the art, the maintenance costs to operate such a system 30 could be significantly greater than the original purchase price. Accordingly, the system 30 includes test and diagnostic routines to pinpoint defective equipment. In particular, the system 30 provides the graphical representation of the aircraft seating arrangement to indicate class of service, equipment locations, and failures of any of the various components to aid in maintenance.

Figure 9:
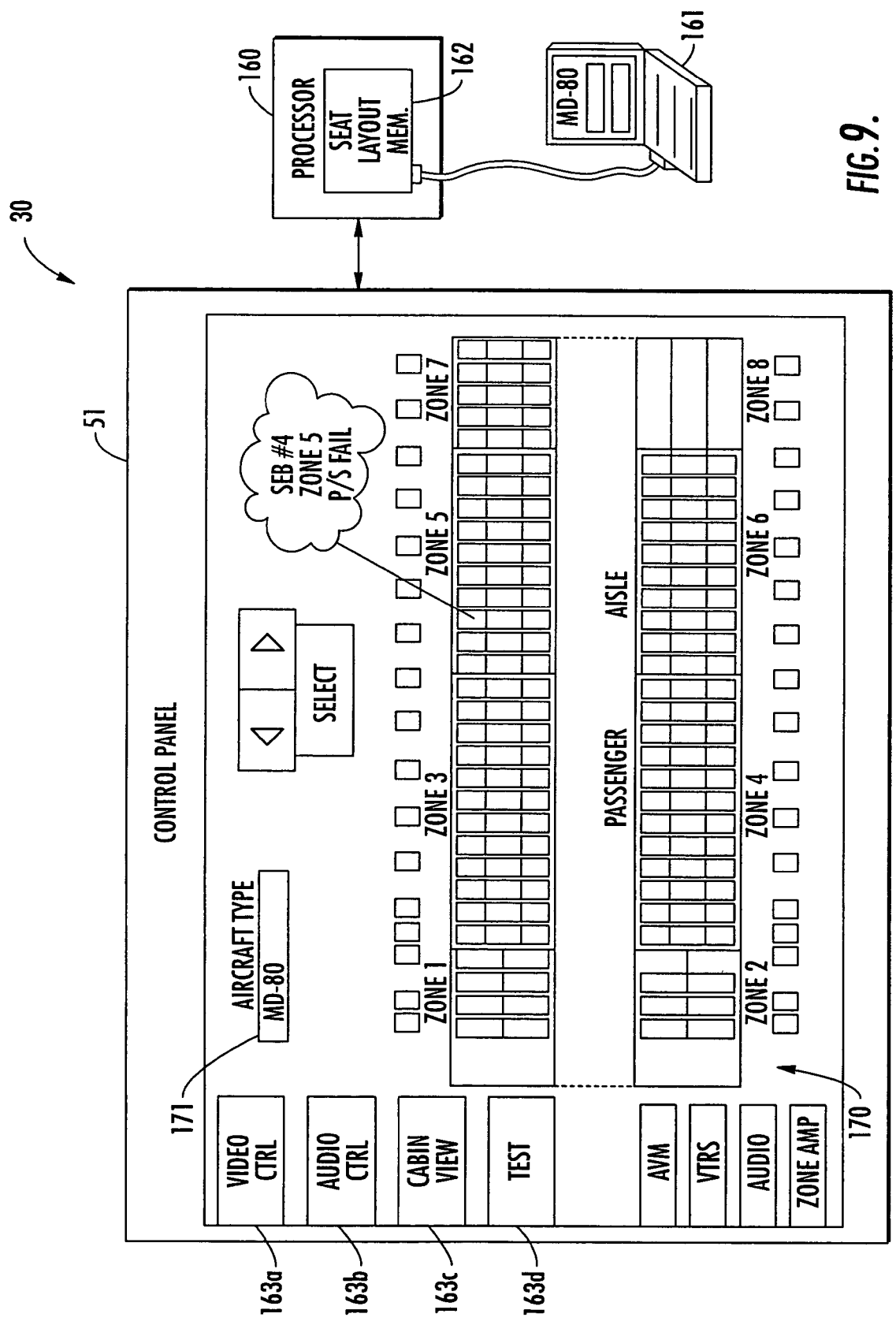
FIGS. 9-11 are simulated control panel displays for the in-flight entertainment system of the invention.

As shown in FIG. 9, the system 30 includes a control panel display 51, and a processor 160 connected to the control panel display. The control panel display 51 and processor 160 may be part of the AVM 50 (FIG. 1), but could be part of one or more of the MRMs 40 (FIG. 1), or part of another monitoring device as will be appreciated by those skilled in the art. The control panel display 51 may be touch screen type display including designated touch screen input areas 163a-163d to also accept user inputs as would also be appreciated by those skilled in the art.

More particularly, the processor 160 generates a seating layout image 170 of the aircraft on the control panel display 51 with locations of the signal distribution devices located on the seating layout image. These locations need not be exact, but should be sufficient to direct the service technician to the correct left or right side of the passenger aisle, and locate the seatgroup and/or seat location for the defective or failed component. In addition, the locations need not be constantly displayed; rather, the location of the component may only be displayed when service is required, for example.

The processor 160 also preferably generates information relating to operation of the signal distribution devices on the display. The signal distribution devices, for example, may comprise demodulators (SEBs 45), modulators (MRMs 40), or the video passenger displays (VDUs 68), for example. Accordingly, a user or technician can readily determine a faulty component and identify its location in the aircraft.

As shown in the illustrated embodiment of FIG. 9, the representative information is a failed power supply module of the #4 SEB of zone 5. In FIG. 10, the information is for a failed #4 MRM. This information is illustratively displayed in text with an indicator pointing to the location of the device. In other embodiments, a flashing icon or change of color could be used to indicate the component or signal distribution device requiring service as will be appreciated by those skilled in the art.

This component mapping and service needed feature of the invention can be extended to other components of the system 30 as will be readily appreciated by those skilled in the art. For example, the processor 160 may further generate information relating to operation of the entertainment source, such as the DBS receiver, or its antenna as shown in FIG. 11. Again, the technician may be guided to the location of the failed component from the seat image layout 170.

Returning again briefly to FIG. 9, another aspect of the invention relates to display of the correct seating layout 170 for the corresponding aircraft 31. As shown, the display 51 may also include an aircraft-type field 171 which identifies the particular aircraft, such as an MD-80. The corresponding seating layout data can be downloaded to the memory 162 or the processor 160 by a suitable downloading device, such as the illustrated laptop computer 161. In other embodiments, the processor 160 may be connected to a disk drive or other data downloading device to receive the seat layout data.

The seat layout data would also typically include the data for the corresponding locations of the devices installed as part of the in-flight entertainment system 30 on the aircraft as will be appreciated by those skilled in the art. Accordingly, upgrades or changes in the system 30 configuration may thus be readily accommodated.

Another aspect of the invention relates to a soft failure mode and is explained with reference to FIGS. 12 and 13. A typical DBS system provides a default text message along the lines "searching for satellite" based upon a weak or missing signal from the satellite. of course, an air traveler may become disconcerted by such a message, since this may raise possible questions about the proper operation of the aircraft. In other systems, a weak received signal may cause the displayed image to become broken up, which may also be disconcerting to the air traveler.

Figure 12:
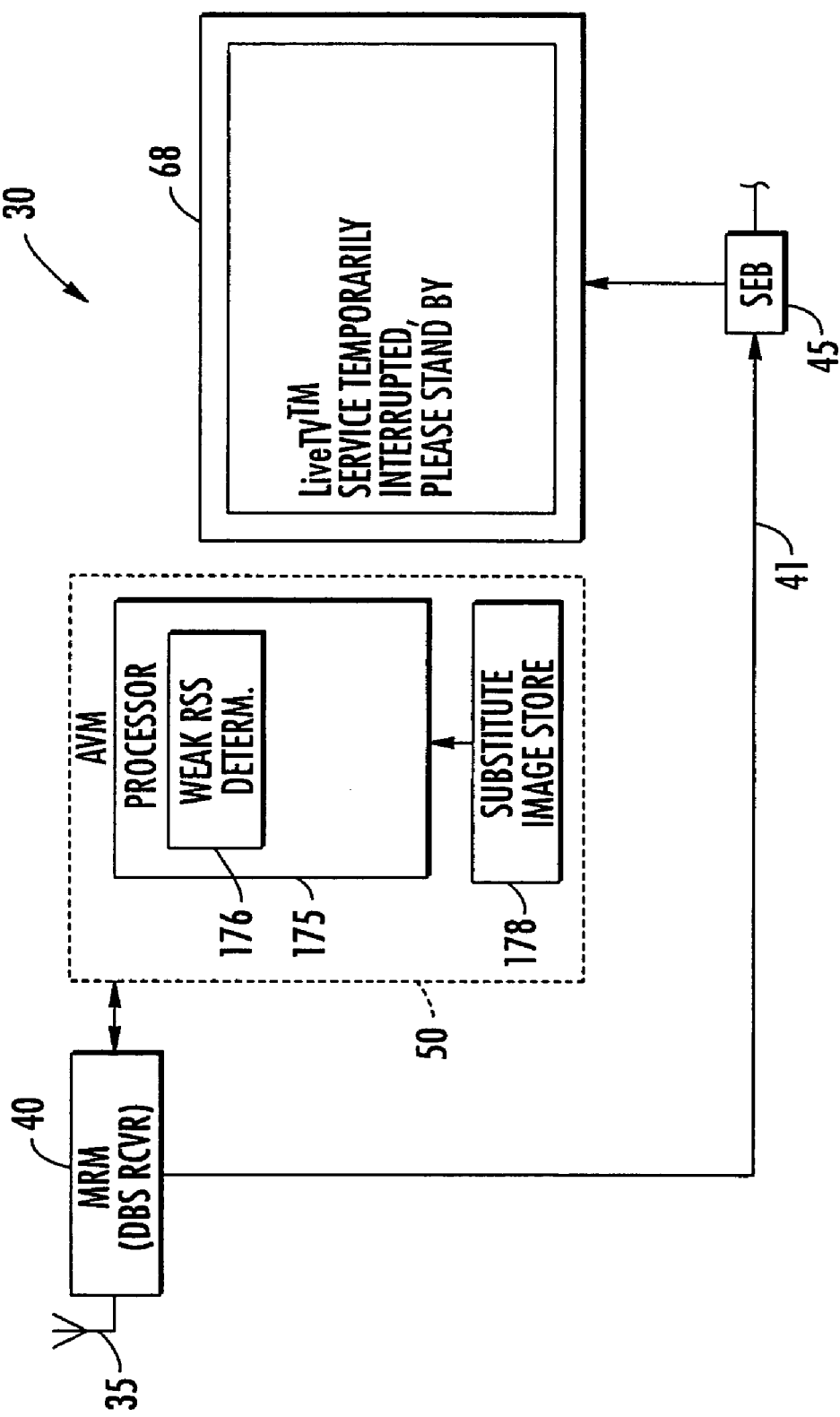
FIG. 12 is a schematic diagram of a portion of the in-flight entertainment system of the invention illustrating a soft-fail feature according to a first embodiment.
Figure 13:
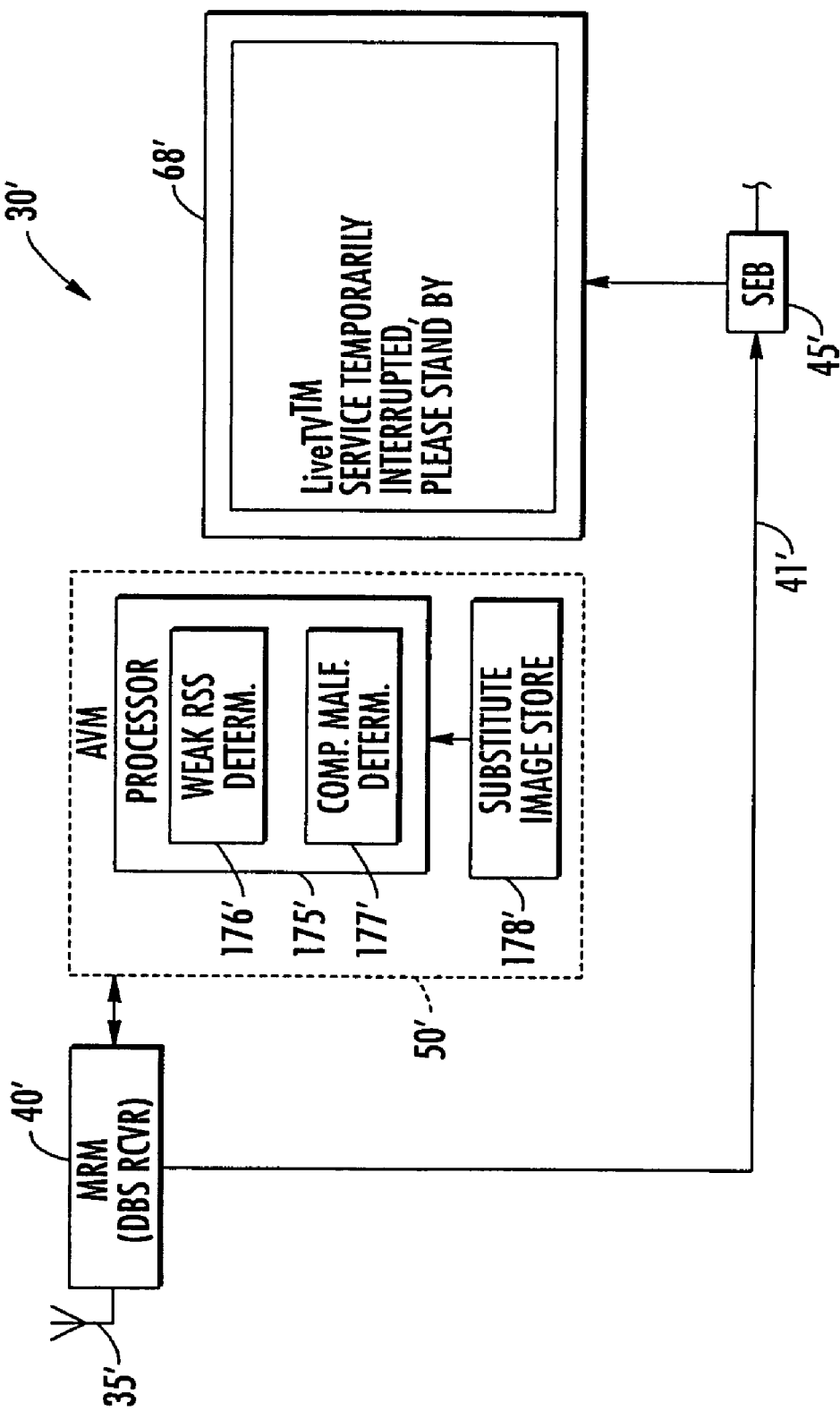
FIG. 13 is a schematic diagram of a portion of the in-flight entertainment system of the invention illustrating a soft-fail feature according to a second embodiment.

The system 30 as shown in FIG. 12 of the present invention includes a processor 175 which may detect the undesired condition in the form of a weak or absent received signal strength, and cause the passenger video display 68 to display a substitute image. More particularly, the processor 175 may be part of the AVM 50 as described above, could be part of another device, such as the MRM 40, or could be a separate device.

The processor 175 illustratively includes a circuit or portion 176 for determining a weak received signal strength as will be appreciated by those skilled in the art. Suitable circuit constructions for the weak received signal strength determining portion or circuit 176 will be readily appreciated by those skilled in the art, and require no further discussion herein. The threshold for the weak received signal strength determining portion or circuit 176 can preferably be set so as to trigger the substitute image before substantial degradation occurs, or before a text default message would otherwise be triggered, depending on the satellite service provider, as would be appreciated by those skilled in the art. In addition, the substitute image could be triggered for a single programming channel upon a weakness or loss of only that single programming channel, or may be generated across the board for all programming channels as will be readily appreciated by those skilled in the art.

In the illustrated system 30 of FIG. 12, a substitute image storage device 178 is coupled to the processor 175. This device 178 may be a digital storage device or a video tape player, for example, for causing the passenger video display 68 to show a substitute image. For example, the image could be a text message, such as "LiveTV™ Service Temporarily Unavailable, Please Stand By". Of course, other similar messages or images are also contemplated by the invention, and which tend to be helpful to the passenger in understanding a loss of programming service has occurred, but without raising unnecessary concern for the proper operation of the aircraft 31 to the passenger.

This concept of a soft failure mode, may also be carried forward or applied to a component malfunction, for example. As shown in the system 30' of FIG. 13, a component malfunctioning determining portion or circuit 177' is added to the processor 175' and can be used in combination with the weak received signal strength determining portion 176'. Of course, in other embodiments the malfunction determining circuit portion 177' could be used by itself. Again, rather than have a disconcerting image appear on the passenger's video display 68', a substitute image may be provided. Those of skill in the art will appreciate that the weak received signal strength and component malfunction are representative of types of undesired conditions that the present system 30 may determine and provide a soft failure mode for. The other elements of FIG. 13 are indicated by prime notation and are similar to those described above with respect to FIG. 12. Accordingly, these similar elements need no further discussion.

Figure 14:
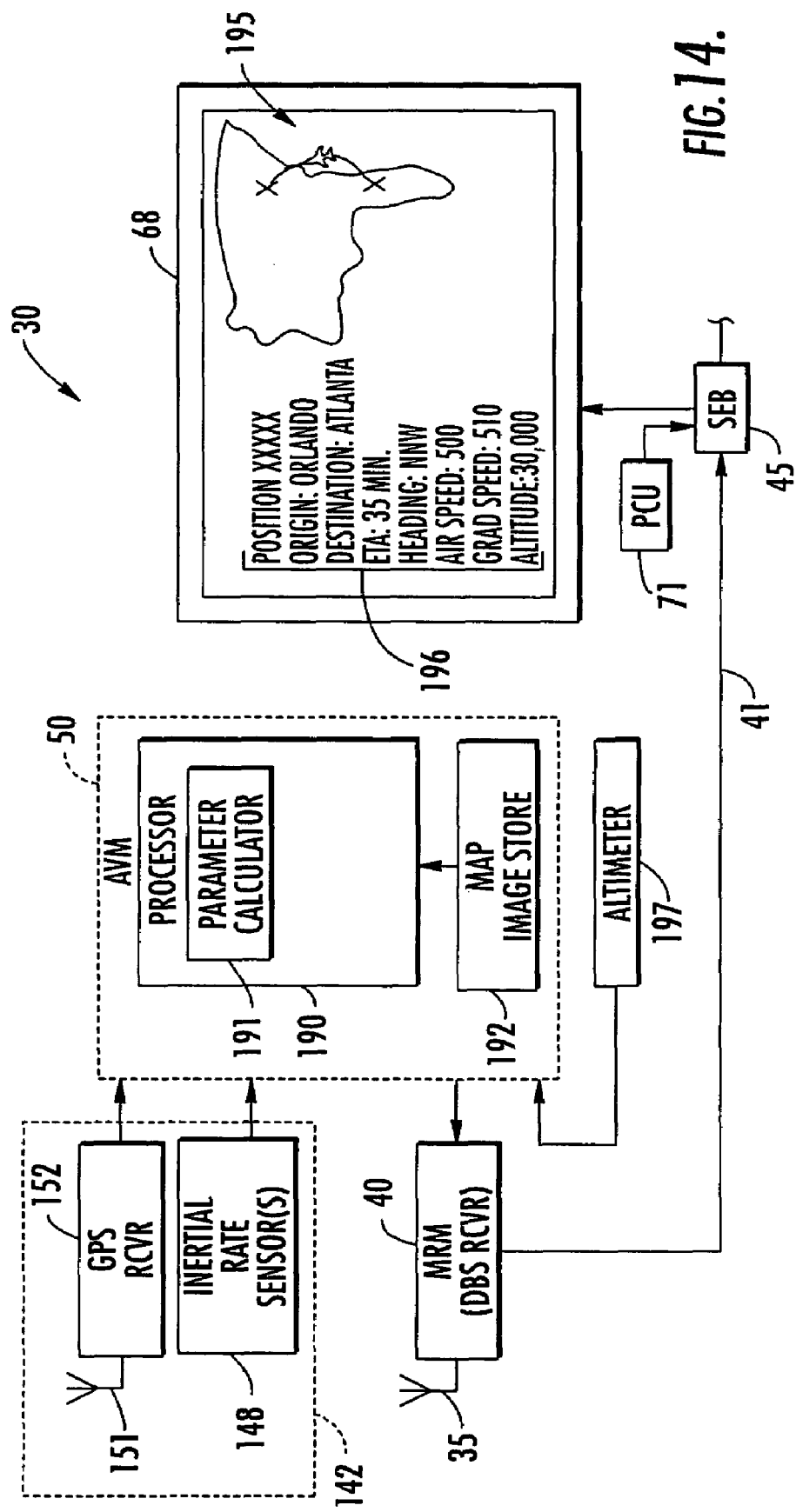
FIG. 14 is a schematic diagram of a portion of the in-flight entertainment system of the invention illustrating a moving map feature according to a first embodiment.

Yet another advantageous feature of the invention is now explained with reference to FIG. 14. Some commercial aircraft provide, on a common cabin display or overhead monitor, a simulated image of the aircraft as it moves across a map between its origin and destination. The image may also include superimposed data, such as aircraft position, speed, heading, altitude, etc. as will be appreciated by those skilled in the art.

The in-flight entertainment system 30 of the invention determines or receives the aircraft position during flight and generates a moving map image 195 of the aircraft as a flight information video channel. Various flight parameters 196 can also be displayed along with the moving map image 195. This flight information channel is offered along with the DBS programming channels during aircraft flight. In the illustrated embodiment, the passenger may select the flight information channel to be displayed on the passenger video display 68 using the passenger control unit (PCU) 71 which is typically mounted in the armrest as described above. In other words, the flight information channel is integrated along with the entertainment programming channels from the DBS system.

As shown in the illustrated embodiment, the moving map image 195 including other related text, such as the flight parameters 196, may be generated by the illustrated AVM 50 and delivered through the signal distribution network 41 to the SEB 45. Since the antenna steering controller 142 (FIG. 6) includes circuitry for determining the aircraft position, etc., these devices may be used in some embodiments for generating the moving map image as will be appreciated by those skilled in the art.

For example, the GPS receiver 152 and its antenna 151 can be used to determine the aircraft position. The GPS receiver 152 is also used to steer the antenna in this embodiment. In other embodiments a separate GPS receiver may be used as will be appreciated by those skilled in the art. As will also be appreciated by those skilled in the art, the inertial rate sensor(s) 148 of the antenna steering controller 142 may also be used in some embodiments for generating flight information.

The processor 190 illustratively includes a parameter calculator 191 for calculating the various displayed flight parameters 196 from the position signal inputs as will be appreciated by those skilled in the art. For example, the parameter calculator 191 of the processor 190 may determine at least one of an aircraft direction, aircraft speed and aircraft altitude for display with the map image. Information may also be acquired from other aircraft systems, such as an altimeter 197, for example, as will be appreciated by those skilled in the art. Also, the illustrated embodiment includes a map image storage device 192 which may include the various geographic maps used for the moving map image 195.

Weather information may also be added for display along with the moving map image 195. Further details on the generation and display of moving map images may be found in U.S. Pat. No. 5,884,219 to Curtwright et al. and U.S. Pat. No. 5,992,882 to Simpson et al., the entire disclosures of which are incorporated herein by reference.

Figure 15:
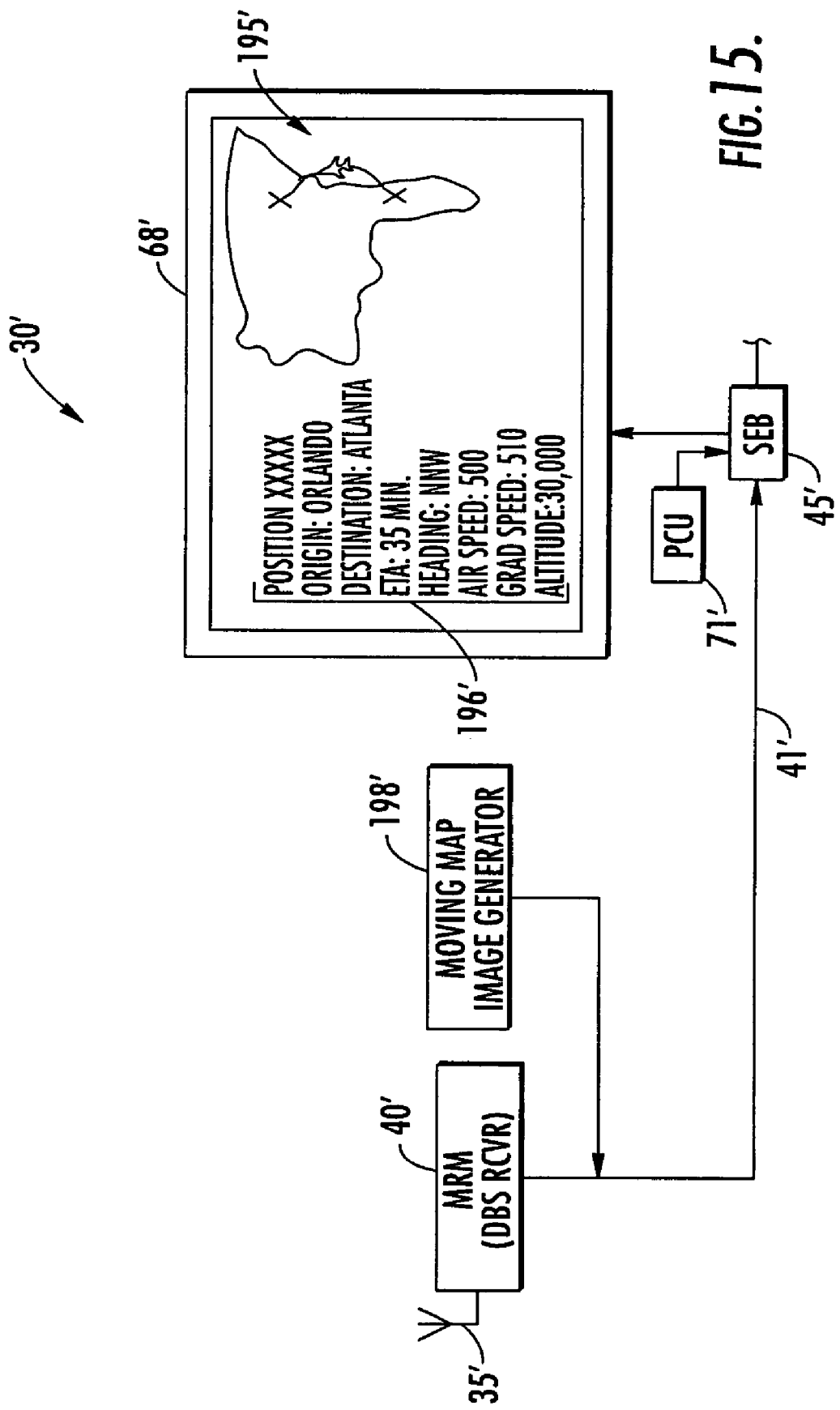
FIG. 15 is a schematic diagram of a portion of the in-flight entertainment system of the invention illustrating a moving map feature according to a second embodiment.

Referring now briefly additionally to FIG. 15, another embodiment of the system 30' including the capability to display a flight information channel among the offered DBS or satellite TV channels is now described. In this embodiment, a moving map image generator 198' is added as a separate device. In other words, in this embodiment, the flight channel signal is only carried through the distribution cable network 41' and delivered via the SEB 45' to the passenger video display 68', and there is no interface to the components of the antenna steering controller 142 as in the embodiment described with reference to FIG. 14. In this embodiment, the moving map image generator 198' may include its own position determining devices, such as a GPS receiver. Alternately, the moving map image generator 198' may also receive the position data or even the image signal from a satellite or terrestrial transmitter.

Figure 16:
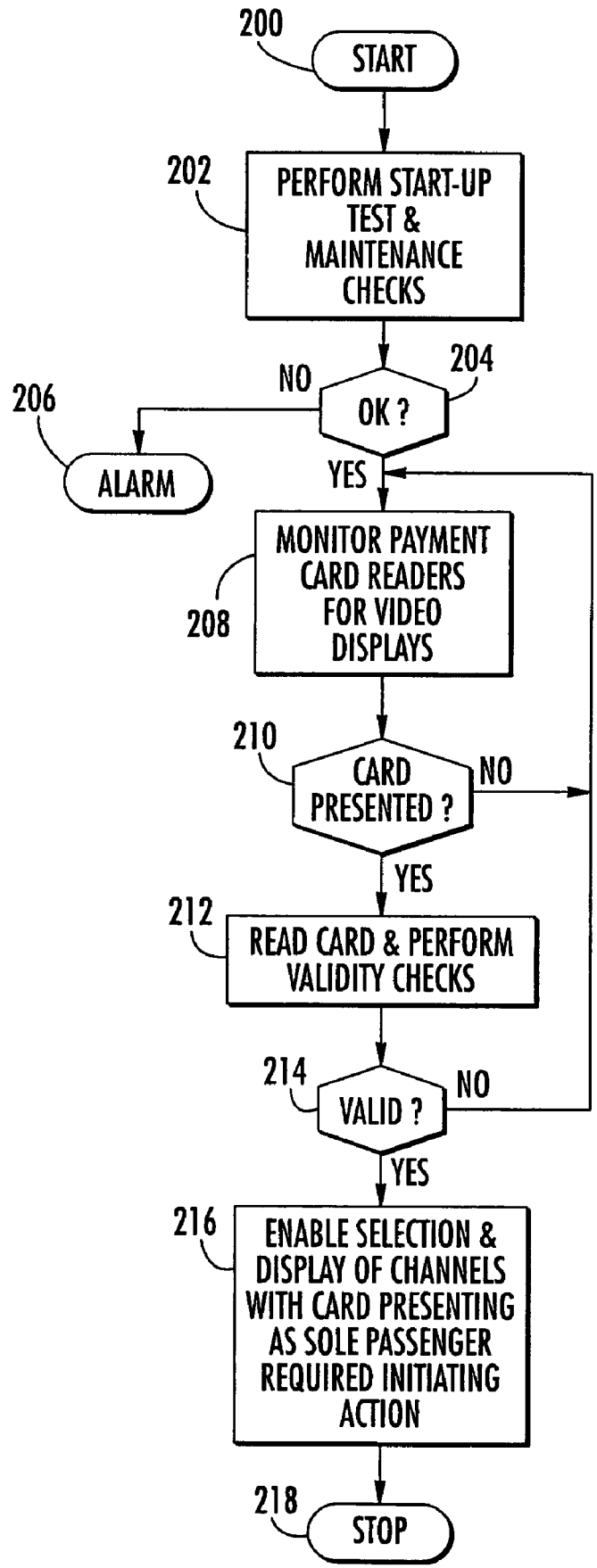
FIG. 16 is a flowchart for a method aspect of the in-flight entertainment system relating to payment and initiation of service in accordance with the invention.
Figure 17:
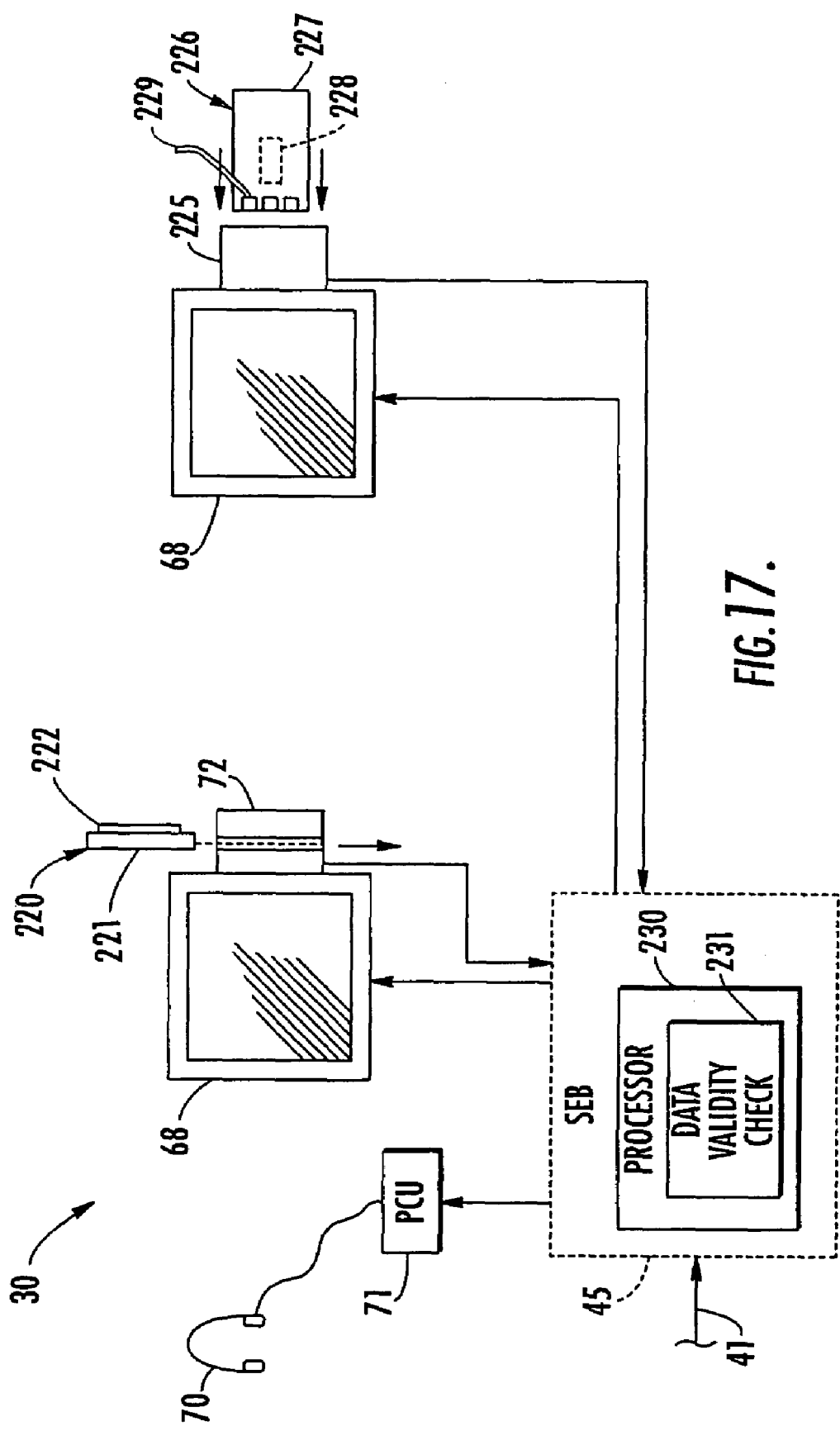
FIG. 17 is a schematic block diagram of the portion of the in-flight entertainment system relating to initiation and payment in accordance with the invention.

Referring now additionally to the flowchart of FIG. 16 and the associated schematic block diagram of FIG. 17, another advantageous aspect of the invention relating to initiation and payment is now described. In particular, from the start (Block 200), the system 30 may be first powered up and it performs its test and maintenance checks at Block 202 as will be appreciated by those skilled in the art. If the system components are determined to be operating correctly (Block 204), the payment card readers 72 are monitored at Block 208. If there is a failure, an alarm may be generated (Block 206) so that corrective action may be taken.

The payment card 220 carried and presented by the passenger for payment may be a credit card, for example, and which includes a plastic substrate 221 and a magnetic stripe 222 thereon. The payment card 220 may also be a debit card, an automated teller machine (ATM) card, a frequent flyer card, or a complimentary card provided by the airline or the entertainment service provider for example. Other types of payment cards are also contemplated by the present invention as will be appreciated by those skilled in the art. The magnetic stripe 222 includes identification information thereon, and may also include expiration data encoded as will be appreciated by those skilled in the art. In the illustrated embodiment, the card reader 72 is a swipe-type reader, wherein the passenger simply swipes the correctly oriented card 220 through a receiving channel or slot.

Other types of card readers are also contemplated by the present invention as will be appreciated by those skilled in the art. For example, the system 30 can also be readily compatible with smart card technology. A smart card reader 225 is shown in the right hand portion of FIG. 17. As will be understood by those skilled in the art, the smart card 226 may include a plastic substrate 227 which carries an integrated circuit 228. The integrated circuit 228 is read or communicated with to arrange for payment. The connection to the integrated circuit 228 may be through contacts 229 carried by the substrate 227, or can be through short range wireless coupling as will be appreciated by those skilled in the art.

In the illustrated embodiment, the passenger video display 68 is connected to the SEB 45, which in turn is connected, via the cable network 41, to the upstream DBS receiver as explained in detail above. The SEB 45 is also connected to the PCU 71 to permit user channel selection, volume control, etc. as will be appreciated by those skilled in the art. Passenger headphones 70 are also illustratively connected to the PCU 71.

On a typical narrow-body aircraft 31, the flight attendants are busy serving food and beverages during the relatively short duration of the flight. Accordingly, if the system 30 could only be manually initiated by the flight attendant after handling a cash exchange, such would be very impractical.

In accordance with the present invention, passenger and airline convenience are greatly enhanced based upon using the passenger's presentation of his payment card 220 to initiate service. In other words, returning again to the flowchart of FIG. 16, if a monitored card reader 72 is determined to have had a card 220 presented thereto (Block 210), the card is read at Block 212.

The processor 230 of the SEB 45 may perform certain basic validity checks on the read data as will be appreciated by those skilled in the art. For example, the processor 230 could provide a check of the validity of the expiration date of the payment card 220. Other validity checks could also be performed, although contact with an authorization center would not typically be desired. For example, the payment card type could also be checked against a preprogrammed list of acceptable or authorized card types. For example, the identifying data may indicate whether the card is an American Express, VISA, Delta Airlines, or service provider complimentary card.

In addition, a data validity or numerical sequence test, such as a CRC test, could be performed on the data to determine its validity. For example, the data may include data necessary to the financial transaction, such as the account number, person's name, expiration date, etc. and additional data which causes the data collectively to pass a certain mathematical function test. In other words, if the card 220 was invalid as determined at Block 214, service could be denied, and/or a certain number of retries could be permitted.

At Block 216, if the optional validity check is successful, the selection and display of the programming channels is enabled before stopping (Block 218). Moreover, in accordance with the invention, the only needed or required initiation input from the passenger is the presentation of a valid payment card 220. The passenger need not enter personalized passwords or hard to remember codes. Accordingly, passenger convenience is greatly enhanced. Risk of revenue loss to the airline is also relatively small since the airline has a record of the assigned passenger for each seat. In addition, the service fee is relatively small.

Although the payment reader 72 has been described for a payment card 220, the invention is also more broadly applicable to any user carried token which includes identifying date thereon for payment. Accordingly many modifications and other embodiments of the invention will come to the mind of one skilled in the art having the benefit of the teachings presented in the foregoing descriptions and the associated drawings.

Figure 18:
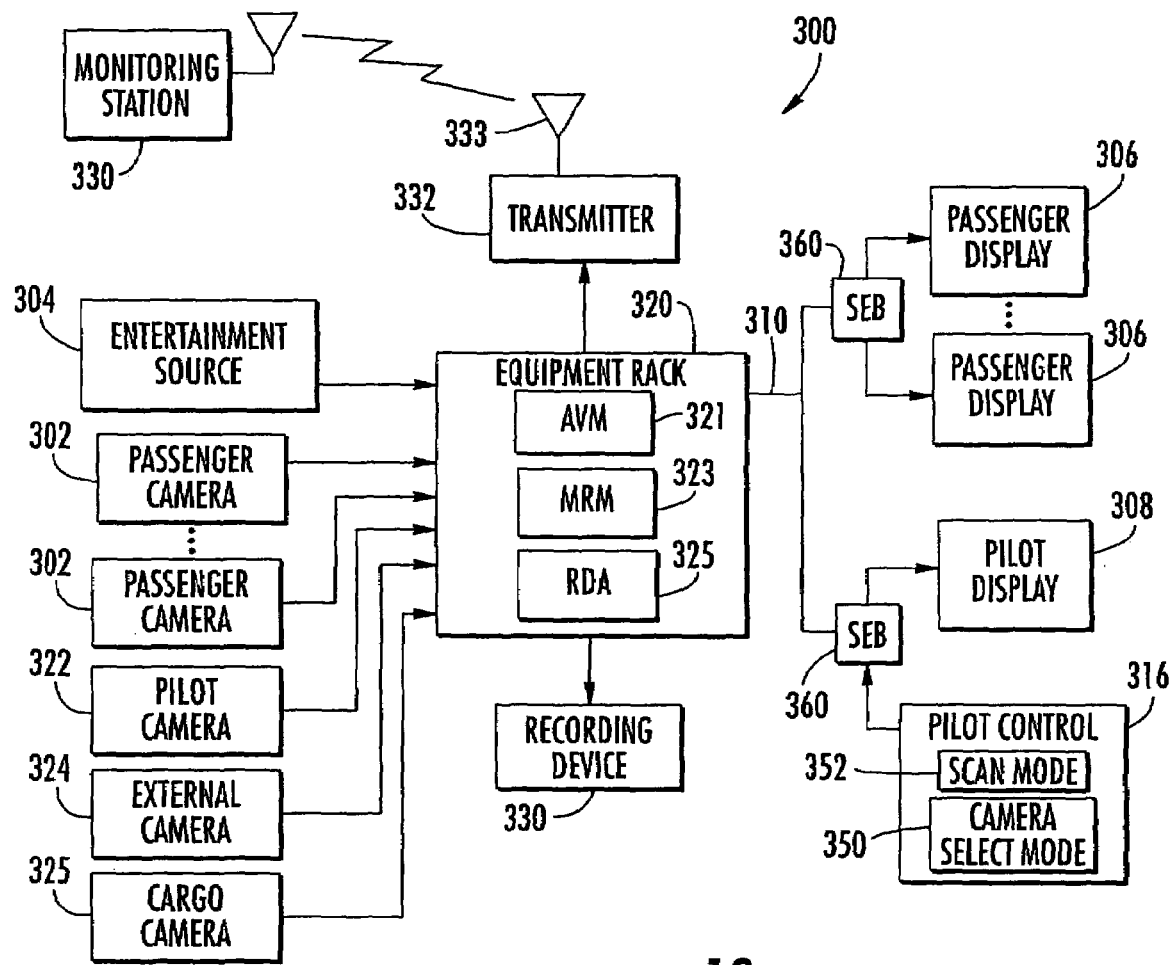
FIG. 18 is a block diagram of another embodiment of an aircraft system in accordance with the invention.
Figure 19:
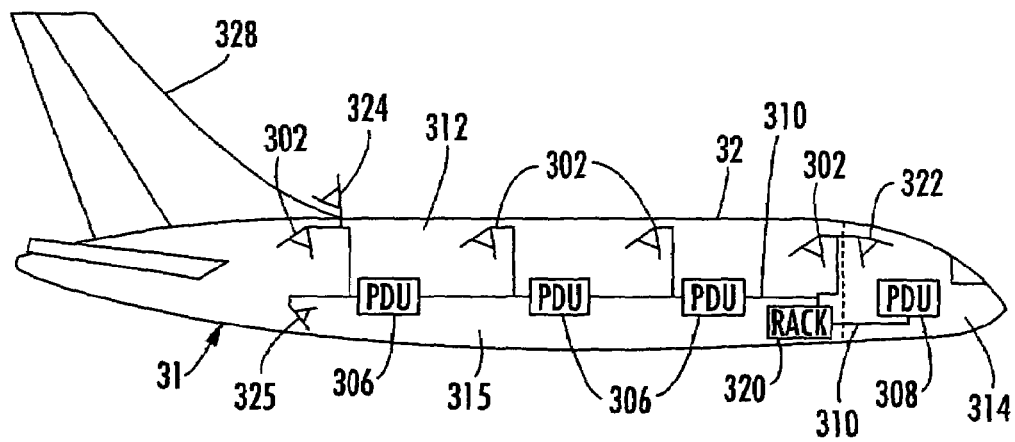
FIG. 19 is a schematic diagram of an aircraft illustrating components of the aircraft system illustrated in FIG. 18.

Another aspect of the invention relates to an aircraft system 300 comprising an in-flight entertainment system and at least one camera, such as passenger cameras 302, for providing aircraft surveillance, as best illustrated in FIGS. 18-19. The illustrated aircraft system 300 comprises an entertainment source 304, at least one passenger display (PDU) 306 for displaying images from the entertainment source, and a signal distribution network 310 connecting the entertainment source to the passenger displays.

Electronic equipment, carried by an equipment rack 320, interfaces between the entertainment source 304 and the signal distribution network 310. The illustrated equipment rack 320 includes an audio/video modulator (AVM) 321, at least one multi-channel receiver/modulator (MRM) 323 and an RF distribution assembly (RDA) 325. Instead of the electronic equipment being collocated in an equipment rack 320, the equipment may installed in different spaced apart locations throughout the aircraft 31 in other embodiments.

The AVM 321 receives inputs from the passenger cameras 302, as well as from the entertainment source 304 which may provide pre-recorded information, for example. If the entertainment source 304 is a satellite television receiver, such as a DBS receiver, for example, then the signals are provided to the MRM 323. There may be more than one MRM 323, such as four, for example. The RDA 325 combines the MRM RF outputs to create a single RF signal comprising up to 48 audio/video channels, for example. The RDA 325 amplifies and distributes the composite RF signal to a predetermined number of zone cable outputs via the signal distribution network 310. The signal distribution network 310 may include a dedicated set of cables interfacing with the various displays 306 and 308, or the cables may also support other functions associated with the in-flight entertainment system. In other embodiments, the signal distribution network 310 may be implemented as a wireless network, or as a combined cable and wireless network.

The aircraft system 300 further includes at least one pilot display (PDU) 308 in the cockpit area 314 of the aircraft 31 for displaying images from the passenger cameras 302. The signal distribution network 310 connects the passenger cameras 302 to the pilot display 308 via a seat electronic box (SEB) 360. As discussed above, the signal distribution network 310 includes a cable network as well as distribution devices, such as the SEBs 360. Since the signal distribution network 310 is typically routed throughout the aircraft 31 for connecting the entertainment source 304 with the passenger displays 306, connection of the passenger cameras 302 and the pilot display 308 may also be provided via the same signal distribution network. This advantageously eliminates hardware redundancy and helps to reduce equipment and installation costs, particularly for retrofits and upgrades.

The aircraft system 300 advantageously allows the pilot to view the images from the passenger cameras 302 while flying the aircraft. In the illustrated embodiment (FIG. 19), four passenger cameras 302 are spaced throughout the passenger area 312 of the aircraft 31. The actual number of passenger cameras 302 is based upon the size and layout of the aircraft, and the desired areas to be monitored. The images from the passenger cameras 302 are displayed on the pilot display 308, and are not typically displayed on the passenger displays 306. That is, the passengers do not view the images from the passenger cameras 302.

Camera control is provided to the pilot via a pilot control unit 316 connected to the pilot display 308 via the SEB 360. Depending on the size of the aircraft 31, there may be two pilot displays 308 in the cockpit area 314, with each display being controlled by a respective pilot control unit 316. For example, one pilot display 308/pilot control unit 316 may be on the left side of the cockpit area 314, and another may be on the right side.

Each pilot control unit 316 may have a camera select mode 350 for selecting a desired passenger camera 302 for viewing. Each pilot control unit 316 may further or alternatively include a scan mode 352 for scanning the images from each passenger camera 302. In other words, the images from a single passenger camera 302 are momentarily displayed before displaying the images from a different passenger camera. This cycle continues through each of the remaining passenger cameras 302, and then repeats. In addition, the pilot display 308 may be configured so that the images from more than one passenger camera 302 may be displayed at one time, i.e., a split screen, as readily understood by one skilled in the art. The pilot may also have the option to view the images from an external camera 324 and a cargo camera 325. These particular cameras will be discussed below.

The pilot may not be limited to viewing images from the various cameras on the pilot display 308. For instance, the pilot may have the option of selecting the weather channel via the pilot control unit 316 so that weather related information may be displayed on the pilot display 308, for example. A weather related programming channel will be discussed in greater detail below.

Another advantageous feature of the aircraft system 300 is based upon the addition of at least one pilot camera 322 in the cockpit area 314 of the aircraft 31 for providing pilot images to the passenger displays 306 via the AVM 321 and the signal distribution network 310. This advantageously allows the pilot to selectively address the passengers, particularly prior to takeoff and landing, for example.

As discussed above, an external camera 324 may also be positioned for providing images from outside the aircraft 31. Images from outside the aircraft 31 may be of flight critical components, such as the tail section 328, for example. Other external cameras 324 may also be placed for providing images of the entry points of the aircraft 31 used by the various aircraft support personnel. A cargo camera 325 may be placed in the cargo bay 315 of the aircraft 31, for example.

The aircraft system 300 further illustratively includes a recording device 330 for recording the images from the various cameras 302, 322, 324 and 325. In addition, the aircraft system 300 further illustratively includes a transmitter 332 for transmitting the images from the various cameras 302, 322, 324 and 325 to a location external the aircraft 31 for remote viewing. The illustrated transmitter 332 has an antenna 333 connected thereto. Interface from the AVM 321 may be provided via an Ethernet connection for providing video snapshots from the different cameras to the transmitter 332, as readily appreciated by one skilled in the art. The remote viewing may be while the aircraft 31 is in flight or on the ground, and is performed at the schematically illustrated monitoring station 370, for example.

Figure 20:
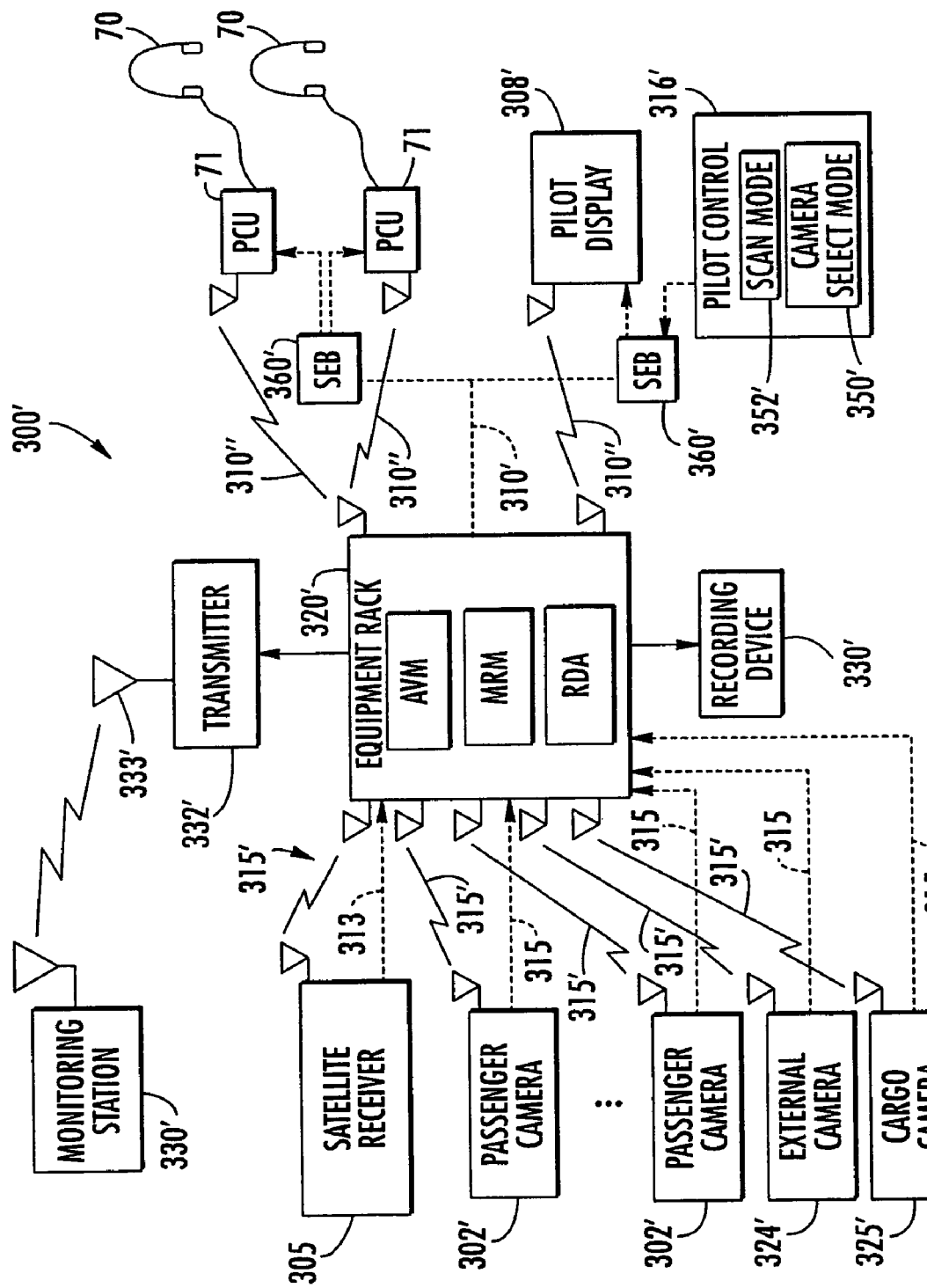
FIG. 20 is a block diagram of another embodiment of the aircraft system illustrated in FIG. 18.

In another embodiment of the aircraft system 300', the entertainment source is a satellite receiver 305 providing only audio channels to the passengers, as illustrated in FIG. 20. The satellite receiver 305 may be compatible with a Sirius Satellite Radio satellite, an XM Satellite Radio satellite, or a WorldSpace satellite, for example, as readily appreciated by those skilled in the art. Since video images are not being displayed to the passengers, passenger control units (PCU) 71 provide the audio channels received by the satellite receiver 305 to the passengers via passenger headphones 70 while the pilot continues to receive images from the various cameras 302', 324' and 325'.

As stated above, the signal distribution network may be implemented as a cable network 310', as a wireless network 310", or as a combined cable and wireless network 310"'. Similarly, the interface between the satellite receiver 305 and the equipment rack 320' may be a wired 313 or a wireless 313' interface, or a combination of both. Likewise, the interface between the various cameras 302', 324' and 325' and the equipment rack may be a wired 315 or a wireless 315' interface, or a combination of both.

Turning now additionally to FIGS. 21 and 22, another feature of the present invention is directed to an in-flight entertainment system 30 receiving terrestrial signals from a plurality of terrestrial transmitters 404, 406. For purposes of discussion, the terrestrial transmitters 404, 406 transmit television (TV) programming channels. However, this aspect of the present invention is not limited to TV programming channels, and is compatible with other types of terrestrial transmitters, such as those associated with voice and data (including e-mail) communications. The partially illustrated in-flight entertainment system 30 further includes an adaptive antenna 400 and a terrestrial receiver 402, such as a terrestrial TV receiver, for receiving the TV programming channels. An antenna 405 is illustratively connected to the terrestrial receiver 402, and at least one display 68 is connected to the terrestrial receiver 402 via the signal distribution network 41.

The illustrated signal distribution network 41 is a cable network. In other embodiments, the signal distribution network may be implemented as a wireless network, or as a combined cable and-wireless network. In addition, if the terrestrial receiver 402 is intended to support voice communications, then the VDU 68 may be supplemented or replaced by a PCU 71. The PCU 71 provides audio channels to a passenger via passenger headphone 70, whereas the VDU 68 provides data (i.e., text and e-mail messages) to the passenger.

A controller 408 is connected to the adaptive antenna 400 for determining a desired terrestrial TV transmitter, and for directing the adaptive antenna 400 for the desired terrestrial TV transmitter. If a new desired terrestrial TV transmitter is determined, then the controller 408 redirects the adaptive antenna for the new desired terrestrial TV transmitter.

Once the aircraft 32 reaches its flying altitude, the adaptive antenna 400 typically has a line of sight path to more than one terrestrial TV transmitter, such as transmitters 404 and 406, for example. Each transmitter 404 and 406 transmits within the same assigned frequency allocation, but the transmitted TV programming channels are not the same. Consequently, this results in the terrestrial TV receiver 402 receiving a corrupted signal that is difficult to process. The controller 408 advantageously determines the desired terrestrial TV transmitter, and directs the adaptive antenna 400 for this transmitter.

As the aircraft 31 travels, it may become out-of-range of the desired terrestrial TV transmitter, and become in-range to a new desired terrestrial TV transmitter. The controller 408 also advantageously determines when to redirect the adaptive antenna 400 for the new desired terrestrial TV transmitter. In one approach for controlling the adaptive antenna 400, the controller 408 determines the desired terrestrial TV transmitter by discriminating among received terrestrial TV signals.

The illustrated controller 408 includes a signal processor 410 for performing the discriminating based upon at least one of a frequency domain analysis and a time domain analysis of the received terrestrial TV signals, as readily understood by one skilled in the art. The signal processor 410 includes an algorithm for weighting the received terrestrial TV signals in the time domain as well as in the frequency domain, with both the amplitude and phase of the signals being weighted. This advantageously allows digital beam steering to be performed in which the received terrestrial TV signals are first digitized and weighted using digital signal processing.

In another approach for controlling the adaptive antenna 400, the controller 408 uses knowledge of the position of the terrestrial TV transmitters 404, 406. That is, the controller 408 -operates in a closed loop configuration. Position of the terrestrial TV transmitters, such as transmitter 404 and 406, for example, are stored in a memory 412 within the controller 408. The memory 412 is connected to the signal processor 410. Alternatively, position of the terrestrial TV transmitters 404, 406 may be stored directly in an embedded memory within the signal processor 410.

To determine position of the aircraft 31, the controller 408 includes a position determining system 414 connected to the signal processor 410. The illustrated position determining system 414 is a GPS receiver, which has an antenna 415 connected thereto. In lieu of using a position determining system 414 within the controller 408, the aircraft navigation system 153 may be used. If the position of the terrestrial TV transmitters 404, 406 are not known, then the controller 408 operates in an open loop configuration and relies on discrimination among the received terrestrial TV signals.

The adaptive antenna 400 will now be discussed in greater detail. In one embodiment, the adaptive antenna 400 comprises a phased array antenna 401 connected to an adaptive processor 411. The adaptive processor 411 interfaces between the signal processor 410 and the phased array antenna 401. The adaptive processor 411 steers an antenna beam from the phased array antenna 401 towards the desired terrestrial TV transmitter, such as transmitter 404, for example, based upon commands from the signal processor 410, as readily appreciate by one skilled in the art. A null from the phased array antenna 400 would then be directed towards the undesired TV transmitter 406. In an alternative embodiment, the function of the adaptive processor 411 and the function of the signal processor 410 are combined into a single processor, which may be within the controller 408 or external the controller, as readily appreciated by one skilled in the art.

The phased array antenna 401 may include several fixed patterns, wherein the adaptive processor 411 selects the desired fixed pattern based upon commands from the signal processor 410, as also readily appreciate by one skilled in the art. Alternatively, the phased array antenna 401 may be a fully adaptive phased array, wherein the adaptive processor 411 selects from an infinite variety of antenna patterns.

As the aircraft 31 travels along its route, the signal processor 410 continues to monitor the received TV programming channels based upon the different relative phases and amplitudes of the received terrestrial TV signals for determining if a different terrestrial TV transmitter is desired. In one embodiment the monitored signals are not passed to the terrestrial TV receiver 402. That is, the monitoring is performed in the controller 408. In particular, if the signal processor 410 determines a new desired terrestrial TV transmitter, then the signal processor redirects the adaptive antenna via the adaptive processor 411 towards the new desired terrestrial TV transmitter, such as transmitter 406, for example. Alternatively, the signal processing function of the controller 408 may be incorporated within the terrestrial TV receiver 402, as readily appreciated by one skilled in the art.

Another feature of the phased array antenna 400 is that multiple beams may be steered or directed so that there is uninterrupted performance when transitioning from the desired terrestrial TV transmitter 404 to the new desired terrestrial TV transmitter 406. In lieu of multiple antenna beams, a time delay may be used to minimize any interruption in the transition from one terrestrial TV transmitter to another.

In another embodiment, the adaptive antenna 400 comprises a plurality of antennas 403 spaced apart on the aircraft 31. As illustrated in FIG. 22, the plurality of antennas 403 include four antennas, for example, with each antenna providing an antenna beam in a respective 90 degree quadrant so that collectively the four antennas provide a 360 degree coverage. The actual number of antennas may vary based upon the desired level of performance, as readily appreciated by one skilled in the art.

In this particular embodiment, the controller 408 selects via the adaptive processor 411 the antenna beam from the quadrant that includes the desired terrestrial TV transmitter 404. To provide a null toward the undesired terrestrial TV transmitters, reception from the remaining antennas are not passed to the terrestrial TV receiver 402. However, the signal processor 410 continues to periodically monitor the received terrestrial TV signals from these antennas for determining if a new desired terrestrial TV transmitter 406 should be selected. If the signal processor 410 determines a new desired terrestrial TV transmitter 406, then the signal processor selects via the adaptive processor 411 a different antenna 403 having its antenna beam covering the quadrant that includes the new desired terrestrial TV transmitter 406.

Figure 23:
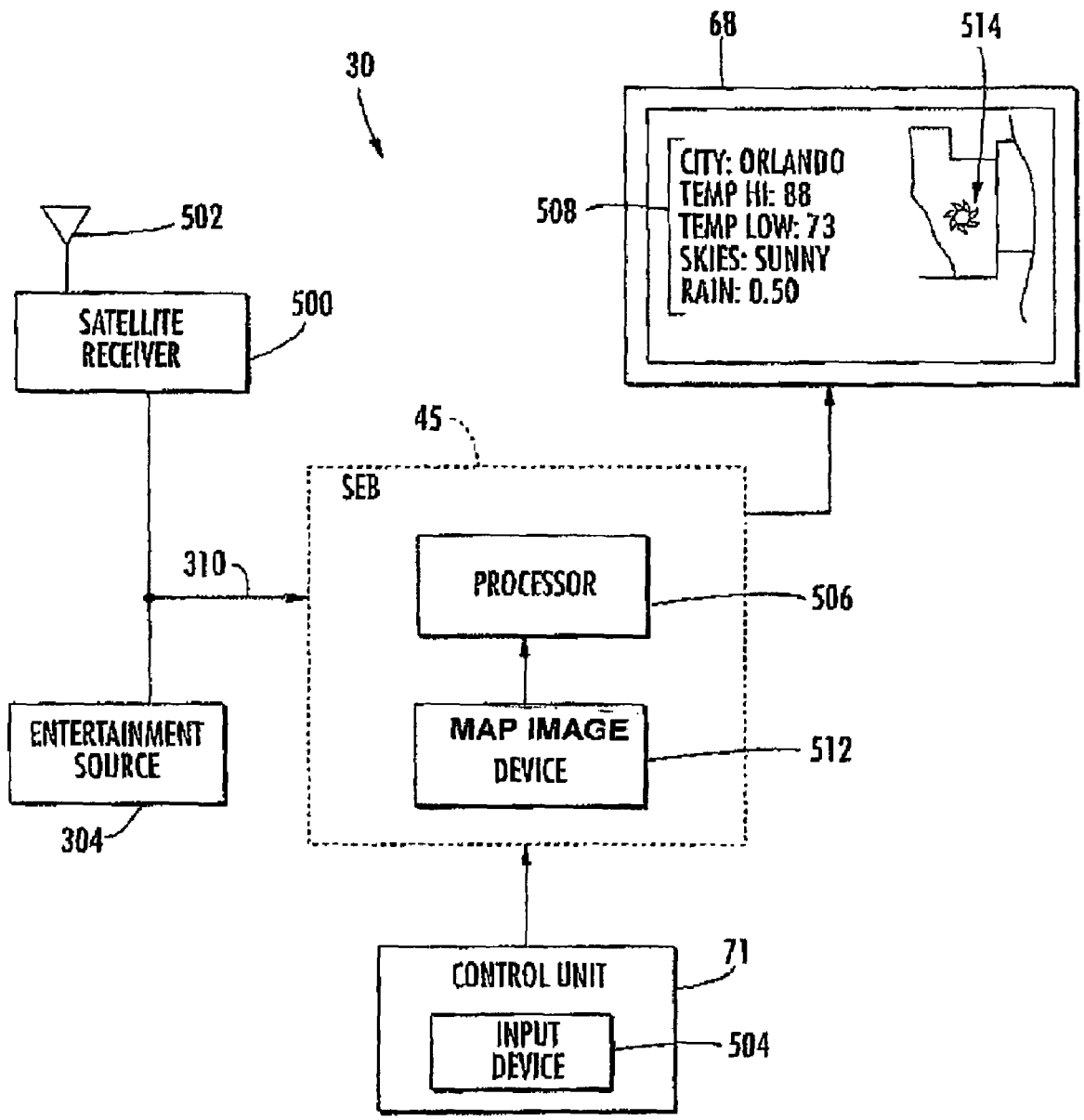
FIG. 23 is a schematic diagram of a portion of the in-flight entertainment system illustrating a weather information feature in accordance with the invention.

Referring now to FIG. 23, the weather information feature of the in-flight entertainment system 30 will now be discussed. The in-flight entertainment system 30, only select components of which are illustrated in FIG. 23, comprises at least one entertainment source 304, a satellite weather information receiver 500 for receiving at least one weather related programming channel from at least one satellite, and a plurality of displays 68 for displaying images from the at least one entertainment source and for displaying weather related information corresponding to selected geographic areas. A signal distribution network 310 connects the entertainment source 304 and the satellite weather information receiver 500 to the plurality of displays 68.

The in-flight entertainment system 30 further comprises a map image device 512 connected to the satellite weather information receiver 500 and to the plurality of displays 68 for storing map images of the selected geographic areas. The displayed weather related information includes the map images. The map image device 512 also comprises a moving map image generator for generating a moving representation of the aircraft position on the map images.

At least one processor 506 is connected to the satellite weather information receiver 500 for determining the weather related information corresponding, to the selected geographic areas. The processor 506 compares the information identifying the selected geographic with information provided by the at least one weather related programming channel. In other words, only a subset of the received weather related information is selected to be displayed. Since the received weather related programming channel is a digital signal, the processor 506 compares stored information identifying the selected geographic areas to the received weather related programming channel, as readily understood by one skilled in the art.

The selected geographic areas comprise geographic areas along a flight path of the aircraft, for example. As the aircraft travels along its flight path, the displays 68 scroll through the weather related information for each selected geographic area. The selected geographic areas also include a destination of the aircraft. This aspect of the weather information feature of the in-flight entertainment system 30 does not require any input from the passengers. The selected geographic areas, which are input into the processor 506 before flight or during the flight, are selected based upon the flight path of the aircraft. This entry may be accomplished by the pilot through a pilot control unit, for example.

Another aspect of the weather information feature is that the passengers may input information into the system for obtaining weather related information on a particular geographic area. A plurality of control units 71 are connected to the plurality of displays 68 for selecting the geographic areas. Each control unit 71 is associated with a respective display, and comprises input means or an input device for selecting the geographic areas. The geographic areas are selected by entering at least one of a city name, a zip code and an area code via the input device The input device may be an alpha-numeric keypad, for example.

The selected geographic area may be a final destination of an aircraft passenger, and consequently, any passenger is able to obtain current weather related information for this particular area via the input device 504. The weather related information 508 displayed on the passenger displays 68 includes the high and low temperatures, relative humidity, and the projected weather forecast, for example.

For example, if Orlando, Fla. is the final destination of the passenger, the passenger enters "Orlando, Fla." via the input device 504. A zip code, area code or other pertinent information may be entered for identifying the selected geographic area. Once "Orlando, Fla." has been entered, this term is compared with the information provided by the weather related programming channel for a match. Since the weather related programming channel is a digital signal, the PCU 71 converts "Orlando, Fla." into a digital signal so that a digital comparison can be made.

If the passenger does not select a geographic area, a default position for the selected geographic area may correspond to a current position of the aircraft 31, for example. The current position of the aircraft 31 may be provided by a positioning determining system, such as a GPS receiver.

The in-flight entertainment system further includes a plurality of signal distribution devices 45 connecting the satellite weather information receiver 500 to the passenger displays 68. The at least one processor 506 may comprise a plurality of processors, with each processor being included within a respective signal distribution device 45.

In one embodiment, the satellite weather information receiver 500 operates within a frequency range of about 1 to 3 GHz, for example. The satellite providing the weather related programming channel may thus be a Sirius Satellite Radio satellite, an XM Satellite Radio satellite, or a WorldSpace satellite, as readily appreciated by those skilled in the art. However, operation of the weather information feature as disclosed herein is not limited to this particular frequency range and to transmissions from these satellites.

Figure 24:
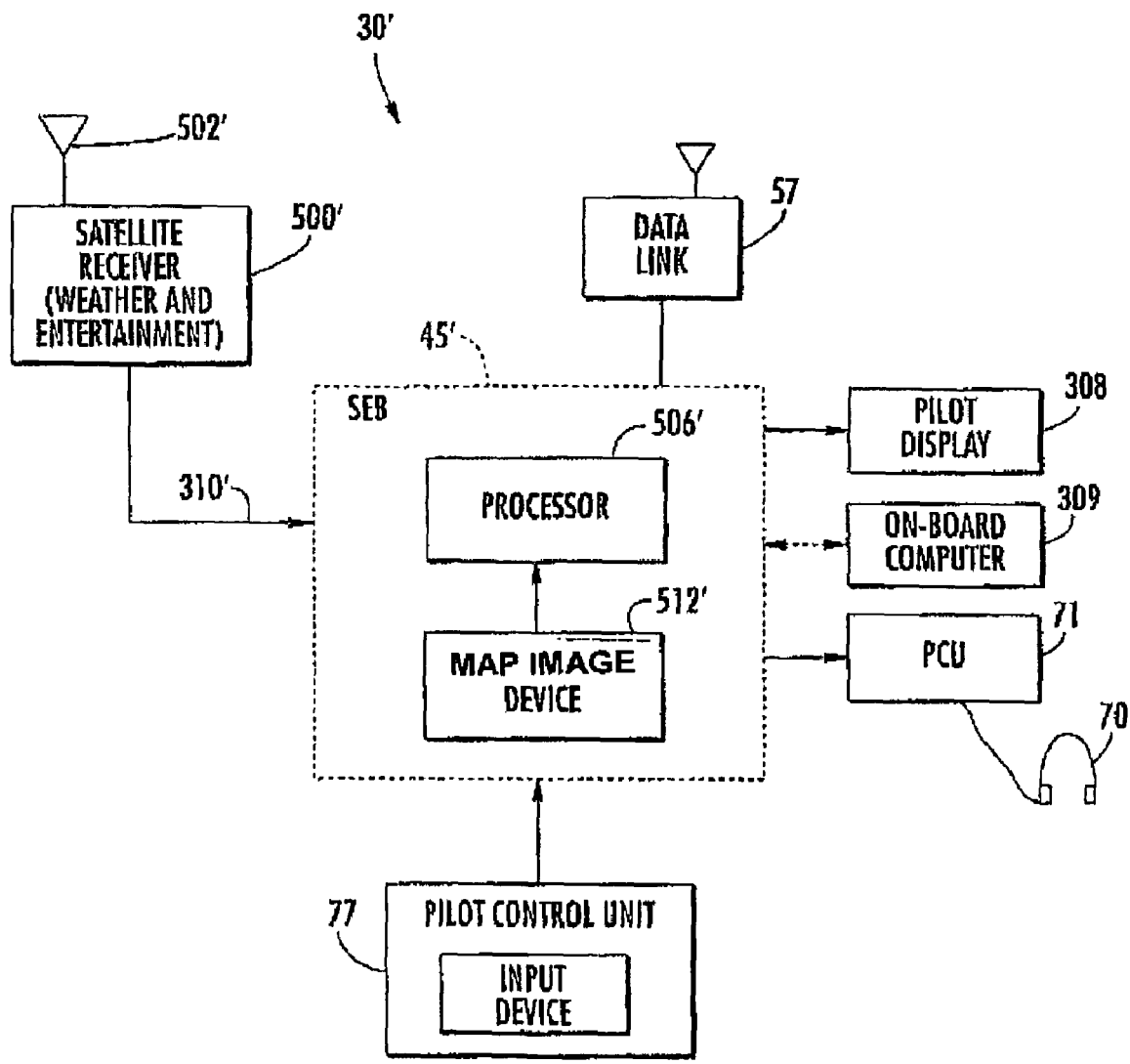
FIG. 24 is a schematic diagram of a portion of the in-flight entertainment system illustrating another embodiment of the weather information feature in accordance with the invention.

Another embodiment 30' of the weather information feature of the in-flight entertainment system will now be discussed with reference to FIG. 24. In this particular embodiment, a satellite receiver 500' is used for receiving at least one weather related programming channel and at least one entertainment related programming channel. The weather related programming channel is for the pilot's benefit for receiving accurate weather information that is regularly updated while in flight.

The weather related information may be displayed on a pilot display 308. A pilot control unit 77 is connected to the pilot display 308 for selecting the geographic areas, and includes an input device for selecting these areas, as discussed above for the passenger control units 71. The pilot display 308 and the pilot control unit 77 may be implemented as separate units or as a single integrated device.

In lieu of a pilot display 308, the weather related information may be displayed on an on-board computer 309, which may be mounted within the cockpit or may be a portable laptop computer carried by the pilot. The geographic areas would also be selected by the on-board computer 309. When the aircraft is on the ground, weather information may be provided to the pilot via a wireless data link 57.

If the entertainment related information provided to the passengers by the satellite receiver 500' is audio only, then passenger control units (PCU) 71 may be used for providing this audio to the passengers via passenger headphones 70. However, in other embodiments, the weather information may also be provided to the passengers (via-the passenger displays 68) as discussed above, along with the weather information being provided to the pilot.

Figure 25:
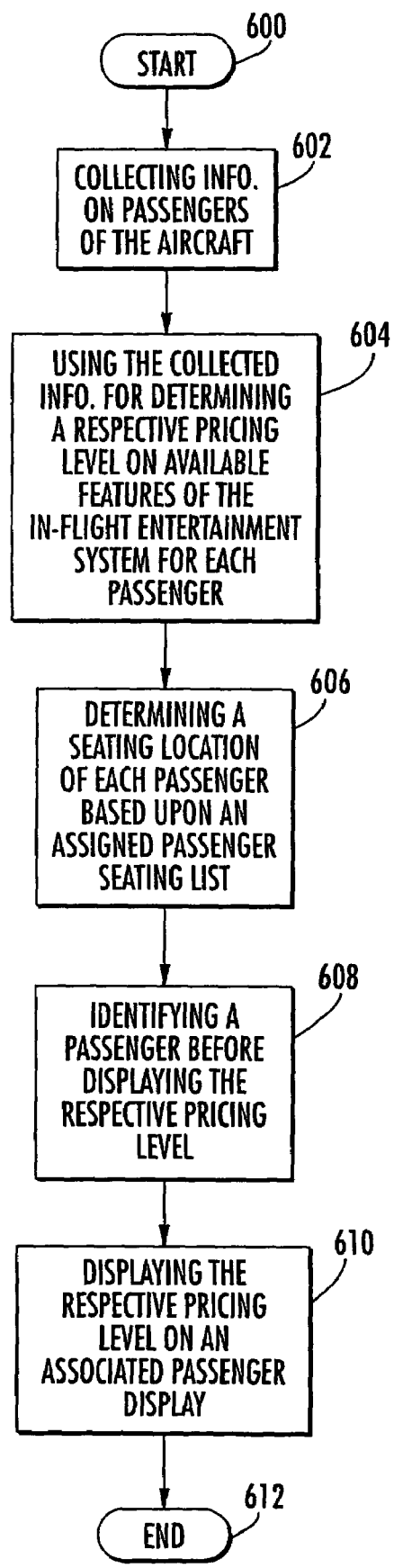
FIG. 25 is a flowchart for a method aspect of the in-flight entertainment system relating to determination of pricing levels thereof based upon passenger profiles in accordance with the invention.
Figure 26:
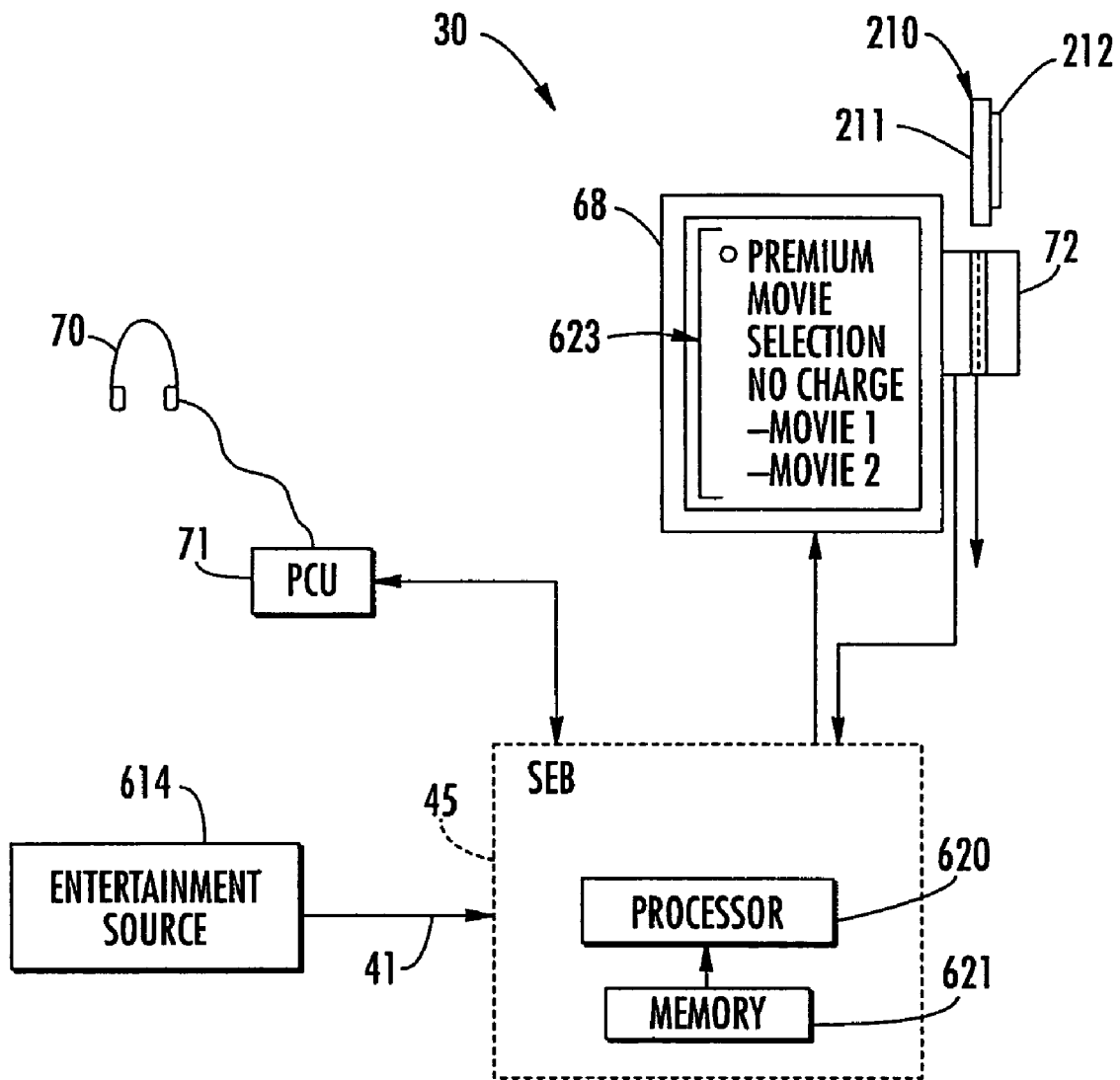
FIG. 26 is a schematic block diagram of components of the in-flight entertainment system relating to determination of pricing levels thereof based upon passenger profiles in accordance with the invention.

Referring now additionally to the flowchart of FIG. 25 and the associated schematic block diagram of FIG. 26, another advantageous feature of the invention relates to determination of a respective pricing level on the available features of the inflight entertainment system 30 for each passenger. From the start (Block 600), information is collected on passengers of the aircraft at Block 602. The information may be generated based upon frequent flyer profiles and an airline passenger database, for example. The collected information may be stored in a memory 621 connected to a processor 620 within the SEB 45.

The in-flight entertainment system 30 uses the collected information at Block 604 for determining a respective pricing level for each passenger on the available features of the system. The entertainment source 614 provides at least one programming channel, and the available features includes the at least one programming channel. The entertainment source 614 comprises a satellite TV receiver, such as a direct broadcast (DBS) receiver, for example.

The available features of the in-flight entertainment system 30 may also include instant messaging, and may provide connecting gate information and other travel related information. The other travel related information may include hotel and rental car information, for example. In addition, the collected information may affect the pricing levels for the various duty free items offered to each passenger when traveling overseas.

The method further includes determining a seating location of each passenger based upon an assigned passenger seating list at Block 606. A passenger is preferably identified at Block

608 before displaying the respective pricing level. This ensures that the passenger receives the correct pricing level.

The identifying may also be performed using a token reader 72 and a token 210 associated therewith. In the illustrated embodiment, the token reader 72 comprises a card swipe reader, and the token 210 comprises a substrate 211 and a magnetic strip 212 thereon. The processor 620 reads the magnetic strip.

After identification, the respective pricing level 623 is displayed on an associated passenger display at Block 610. The token reader 72 may comprise a payment token reader, and the token 210 comprises a payment token, such as a credit card. Consequently, the method further includes a passenger using the payment token 210 to pay, if necessary, for selected features of the in-flight entertainment system 30 according to the respective pricing level. The method ends at Block 612.

The collected information may be based upon frequent flyer profiles, a separate airline database, and an assigned passenger seating list, for example. The collected information is preferably updated before each flight. Passengers that frequently travel and passengers that fly first class would have a lower pricing level on the available features of the inflight entertainment system 30 as compared to passengers that seldom travel. A respective pricing level would thus vary between passengers in first class and in coach. Premium services would then be provided at little or no cost to a passenger in first class, whereas the same services would be offered to a passenger in coach but at a higher cost.

The illustrated processor 620 generates on the passenger displays 68 a respective pricing level on available features of the in-flight entertainment system 30 for each passenger. As noted above, each respective pricing level is based upon information collected on aircraft passengers. The collected information may be stored in the memory 621. The processor 620 also determines a seating location of each passenger based upon an assigned passenger seating list.

The illustrated processor 620 is included within a respective seat electronics box 45 connecting the entertainment source 614 to the passenger displays 68. A PCU 71 is illustratively connected to the SEB 45, and passenger headphones 70 are connected to the PCU.

Figure 27:
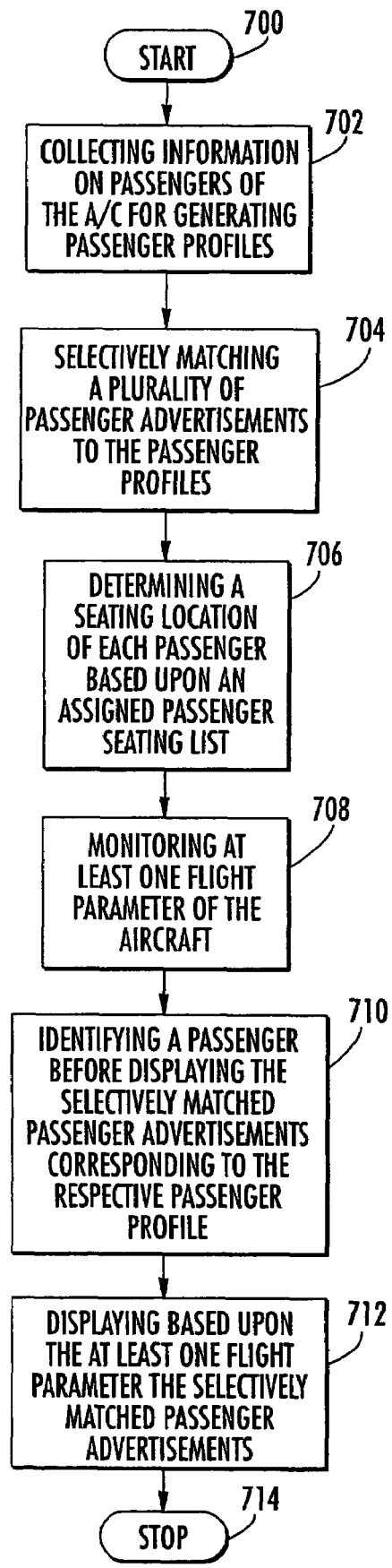
FIG. 27 is a flowchart for a method aspect of the in-flight entertainment system relating to selectively matching advertisements based upon passenger profiles in accordance with the invention.
Figure 28:
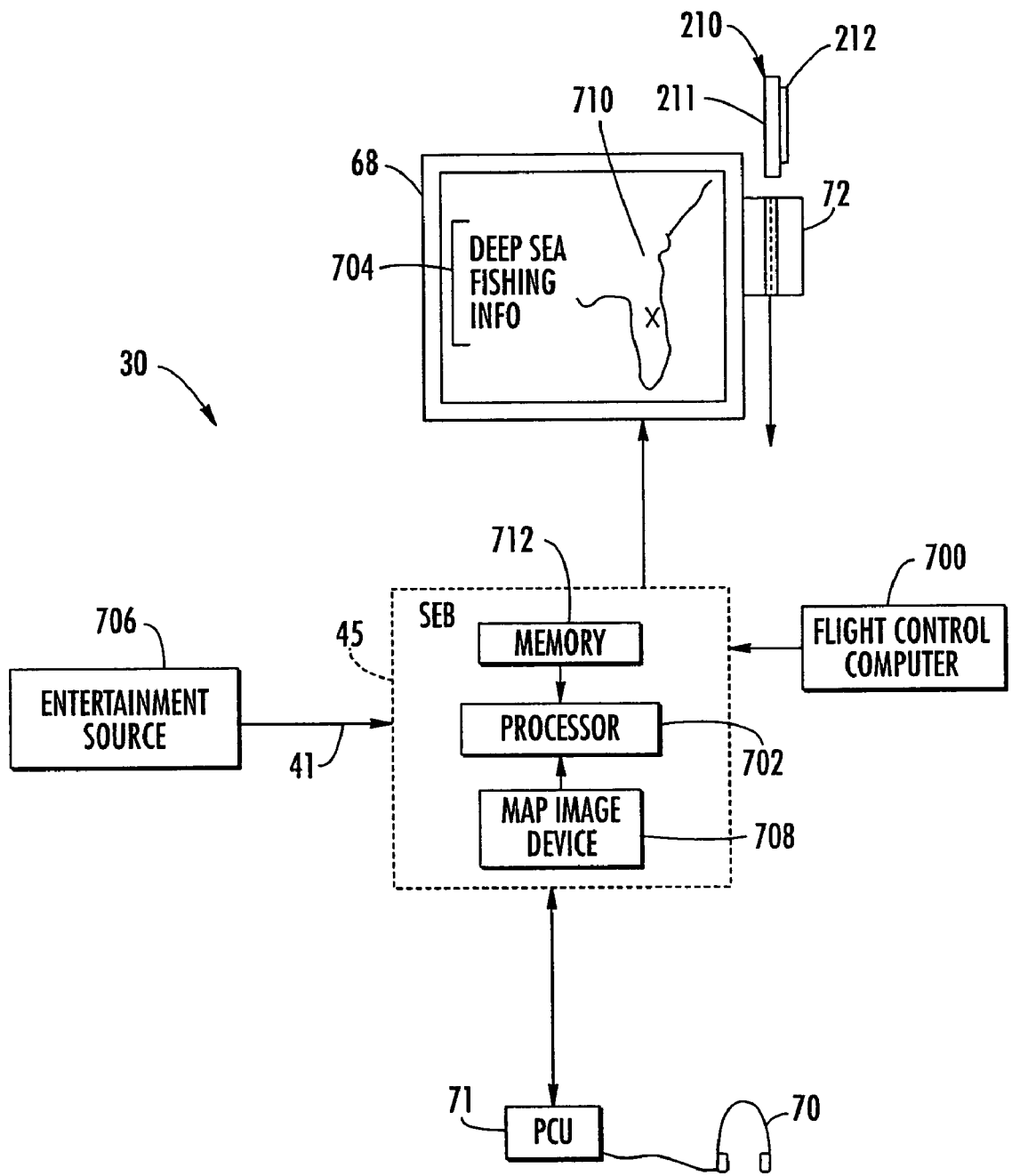
FIG. 28 is a schematic block diagram of components of the in-flight entertainment system relating to selectively matching advertisements based upon passenger profiles in accordance with the invention.

Referring now additionally to the flowchart of FIG. 27 and the associated schematic block diagram of FIG. 28, another advantageous feature of the inflight entertainment system 30 relates to selectively matching advertisements based upon passenger profiles. From the start (Block 700), information is collected on passengers of the aircraft at Block 702, and passenger profiles are generated based upon the collected information.

The method according to the present invention advantageously generates a profile for each passenger, and selectively matches advertisements to each passenger based upon the generated profile. This allows the airlines to generate increased advertisement revenue. The collected information may be based upon frequent flyer profiles and airline passenger databases, for example.

Passenger profiles are selectively matched to the passenger profiles at Block 704. The method further includes determining a seating location of each passenger based upon an assigned passenger seating list at Block 706. In addition, at least one flight parameter of the aircraft 31 is monitored at Block 708. The at least one flight parameter may comprise at least one of a geographic location of the aircraft 31, an estimated time of arrival of the aircraft, and destination of the aircraft.

A passenger is identified at Block 710 before displaying the selectively matched passenger advertisements on an associated passenger display 68. This ensures that the correct passenger receives the appropriate advertisements. The verifying may be performed using a token reader 72 and a token 210 associated therewith. After verification, the selectively matched passenger advertisements corresponding to respective passenger profiles are displayed at Block 712 based upon the monitored flight parameter. The method ends at Block 714.

For example, as the aircraft 31 approaches its final destination, the flight control computer 700 reports the position of the aircraft 31 to a processor 702. In lieu of the flight control computer 700, a position determining system, such as a GPS receiver, may be used to provide the position of the aircraft 31 to the processor 702.

The processor 702 is programmed to generate advertisements within a predetermined range of the airport, such as 100 miles, for example. Other aircraft parameters may be used to trigger display of the advertisements, as mentioned above. If a passenger profile indicates that the passenger is an avid fisherman, and the passenger's destination is Orlando, for example, then the selectively matched advertisements 704 are directed toward deep-sea fishing off the coast of Florida.

A map image storage device 708 connected to the processor 702 provides an image 710 of the coast of Florida. This directly enhances the displayed advertisement 704. The advertisement 704 may include information on chartered fishing boats, and even lodging and restaurant information. A memory 712 is also connected to the processor 702 for storing the selectively matched passenger advertisements, and the passenger profiles. Alternatively, the memory may be embedded within the processor 702.

The in-flight entertainment system 30 also comprises an entertainment source 706, such as a direct broadcast (DBS) receiver. The entertainment source 706 may also be used to provide the pre-recorded advertisements. Alternatively, the passenger advertisements from the entertainment source 706 may be inserted with other programming channels or may appear on its own dedicated channel(s). The illustrated processor 702 may be included within a respective SEB 45 connecting the satellite receiver to the passenger displays 68. A PCU 71 is illustratively connected to the SEB 45, and passenger headphones 70 are connected to the PCU.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

In addition, other features relating to the aircraft in-flight entertainment system are disclosed in copending patent applications filed concurrently herewith and assigned to the assignee of the present invention and are entitled AIRCRAFT SYSTEM PROVIDING PASSENGER ENTERTAINMENT AND SURVEILLANCE FEATURES, AND ASSOCIATED METHODS, Ser. No. 10/428,650; AIRCRAFT IN-FLIGHT ENTERTAINMENT SYSTEM RECEIVING TERRESTRIAL TELEVISION BROADCAST SIGNALS AND ASSOCIATED METHODS, Ser. No. 10/428,268; AIRCRAFT IN-FLIGHT ENTERTAINMENT SYSTEM GENERATING A PRICING STRUCTURE FOR AVAILABLE FEATURES, AND ASSOCIATED METHODS, Ser. No. 10/428,239; and AIRCRAFT IN-FLIGHT ENTERTAINMENT SYSTEM PROVIDING PASSENGER SPECIFIC ADVERTISEMENTS AND ASSOCIATED METHODS, Ser. No. 10/428,234, the entire disclosures of which are incorporated herein in their entirety by reference.

That which is claimed is:

1. An aircraft in-flight entertainment system comprising:
   at least one entertainment source for providing entertainment related data;
   a satellite weather information receiver for receiving at least one weather related programming channel from at least one satellite, the at least one weather related programming channel providing information on different geographic areas;
   a signal distribution network connecting said at least one entertainment source and said satellite weather information receiver;
   a plurality of seat electronic boxes (SEBs) spaced throughout the aircraft and connected to said signal distribution network, each SEB comprising at least one processor for
      comparing information on the different geographic areas provided by the at least one weather related programming channel with selected geographic areas, and
      determining the weather related information corresponding to the selected geographic areas;
   a plurality of passenger seatback displays coupled to said plurality of SEBs for displaying the entertainment related data and for displaying the weather related information corresponding to the selected geographic areas; and
   a plurality of passenger control units coupled to said plurality of SEBs, each passenger control unit associated with a respective passenger seatback display for permitting passenger selection of a geographic area from among a plurality of geographic areas including non-destination geographic areas, and each passenger control unit comprising an alpha-numeric keypad for entry of a city name corresponding to the geographic area being selected.

2. An aircraft in-flight entertainment system according to claim 1 further comprising a map image device connected to said satellite weather information receiver and to said plurality of passenger seatback displays for storing map images of the selected geographic areas, and wherein the displayed weather related information includes the map images.

3. An aircraft in-flight entertainment system according to claim 2 wherein said map image device comprises a moving map image generator for generating a moving representation of the aircraft position on the map images.

4. An aircraft in-flight entertainment system according to claim 1 wherein the selected geographic areas comprise geographic areas along a flight path of the aircraft.

5. An aircraft in-flight entertainment system according to claim 1 wherein displaying the weather related information comprises scrolling through the weather related information to be displayed for each selected geographic area.

6. An aircraft in-flight entertainment system according to claim 1 wherein the selected geographic areas comprise a destination of the aircraft.

7. An aircraft in-flight entertainment according to claim 1 wherein the geographic areas are further selected by user entry of at least one of a zip code and an area code.

8. An aircraft in-flight entertainment system according to claim 1 wherein said satellite weather information receiver operates within a frequency range of about 1 to 3 GHz.

9. An aircraft in-flight entertainment system according to claim 1 wherein said at least one entertainment source comprises a satellite television (TV) receiver.

10. An aircraft in-flight entertainment system according to claim 9 wherein said satellite TV receiver comprises a direct broadcast satellite (DBS) receiver.

11. An aircraft in-flight entertainment system comprising:
    at least one entertainment source for providing entertainment related data;
    a satellite weather information receiver for receiving at least one weather related programming channel from at least one satellite, the at least one weather related programming channel providing information on different geographic areas;
    a signal distribution network connecting said at least one entertainment source and said satellite weather information receiver;
    a plurality of seat electronic boxes (SEBs) spaced throughout the aircraft and connected to said signal distribution network, each SEB comprising a map image device for generating map images of selected geographic areas, and at least one processor for
       comparing information on the different geographic areas provided by the at least one weather related programming channel with the selected geographic areas, and
       determining the weather related information corresponding to the selected geographic areas;
    a plurality of passenger seatback displays coupled to said plurality of SEBs for displaying the entertainment related data and for displaying the weather related information on the map images corresponding to the selected geographic areas; and
    a plurality of passenger control units coupled to said plurality of SEBs, each passenger control unit associated with a respective passenger seatback display for permitting passenger selection of a geographic area from among a plurality of geographic areas including non-destination geographic areas, and each passenger control unit comprising an alpha-numeric keypad for entry of a city name corresponding to the geographic area being selected.

12. An aircraft in-flight entertainment system according to claim 11 wherein said map image device comprises a moving map image generator for generating a moving representation of the aircraft position on the map images.

13. An aircraft in-flight entertainment system according to claim 12 wherein the selected geographic areas comprise geographic areas along a flight path of the aircraft.

14. An aircraft in-flight entertainment system according to claim 11 wherein displaying the weather related information comprises scrolling through the weather related information to be displayed for each selected geographic area.

15. An aircraft in-flight entertainment system according to claim 11 wherein the selected geographic areas comprise a destination of the aircraft.

16. An aircraft in-flight entertainment according to claim 11 wherein the geographic areas are further selected by user entry of at least one of a zip code and an area code.

17. An aircraft in-flight entertainment system according to claim 11 wherein said satellite weather information receiver operates within a frequency range of about 1 to 3 GHz.

18. An aircraft in-flight entertainment system according to claim 11 wherein said at least one entertainment source comprises a satellite television (TV) receiver.

19. An aircraft in-flight entertainment system according to claim 18 wherein said satellite TV receiver comprises a direct broadcast satellite (DBS) receiver.

20. An aircraft in-flight entertainment system comprising:
a satellite receiver for receiving at least one weather related programming channel and at least one entertainment related programming channel from at least one satellite, the at least one weather related programming channel providing information on different geographic areas;
a signal distribution network connected to said satellite receiver;
at least one pilot seat electronic box (SEB) connected to said signal distribution network, said at least one pilot SEB comprising at least one processor for
comparing information on the different geographic areas provided by the at least one weather related programming channel with selected geographic areas, and
determining the weather related information corresponding to the selected geographic areas;
at least one pilot display coupled to said at least one pilot SEB for displaying weather related information from said satellite receiver corresponding to the selected geographic areas;
at least one pilot control unit connected to said at least one pilot SEB, and comprising an alpha-numeric keypad for entry of a city name corresponding to the geographic area being selected;
a plurality of passenger SEBs spaced throughout the aircraft and connected to said signal distribution network;
a plurality of passenger seatback displays coupled to said plurality of passenger SEBs for displaying the entertainment related data and for displaying the weather related information corresponding to the selected geographic areas; and
a plurality of passenger control units coupled to said plurality of passenger SEBs, each passenger control unit associated with a respective passenger seatback display for permitting passenger selection of the entertainment related data and the weather related information corresponding to the selected geographic areas.

21. An aircraft in-flight entertainment system according to claim 20 further comprising a map image device connected to said satellite receiver and to said at least one pilot display for storing map images of the selected geographic areas, and wherein the displayed weather related information includes the map images.

22. An aircraft in-flight entertainment system according to claim 20 wherein the selected geographic areas comprise geographic areas along a flight path of the aircraft.

23. An aircraft in-flight entertainment system according to claim 20 further comprising a wireless data link for receiving weather related information while the aircraft is on the ground;
said at least one pilot display for displaying the weather related information from said wireless data link; and
said signal distribution network connecting said wireless data link to said at least one pilot display.

24. An aircraft in-flight entertainment system according to claim 20 wherein said satellite receiver comprises a direct broadcast satellite (DBS) receiver.

25. A method for operating an aircraft in-flight entertainment system comprising at least one entertainment source for providing entertainment related data, a satellite weather information receiver for receiving at least one weather related programming channel from at least one satellite, a signal distribution network connecting the at least one entertainment source and the satellite weather information receiver, a plurality of seat electronic boxes (SEBs) spaced throughout the aircraft and connected to the signal distribution network, each SEB comprising at least one processor; a plurality of passenger seatback displays coupled to the plurality of SEBs for displaying the entertainment related data and for displaying weather related information corresponding to selected geographic areas, a plurality of passenger control units coupled to the plurality of SEBs, each passenger control unit associated with a respective SEB, the method comprising:
receiving via the satellite weather information receiver at least one weather related programming channel from at least one satellite, the at least one weather related programming channel providing information on different geographic areas; and
permitting passenger selection of weather related information corresponding to a selected geographic area from among a plurality of geographic areas including non-destination geographic areas via a respective passenger control unit, each passenger control unit comprising an alpha-numeric keypad for entry of a city name corresponding to the geographic area being selected
comparing within the at least one processor in the SEB associated with the respective passenger control unit information on the different geographic areas provided by the at least one weather related programming channel with selected geographic areas, and determining the weather related information corresponding to the selected geographic areas; and
displaying on the associated passenger seatback display the weather related information corresponding to the selected geographic areas.

26. A method according to claim 25 wherein the aircraft in-flight entertainment system further comprises a map image device connected to the satellite weather information receiver and to the plurality of displays for storing map images of the selected geographic areas, and wherein the displayed weather related information includes the map images.

27. A method according to claim 26 wherein the map image device comprises a moving map image generator for generating a moving representation of the aircraft position on the map images.

28. A method according to claim 25 wherein the selected geographic areas comprise geographic areas along a flight path of the aircraft.

29. A method according to claim 25 wherein displaying the weather related information comprises scrolling through the weather related information to be displayed for each selected geographic area.

30. A method according to claim 25 wherein the selected geographic areas comprise a destination of the aircraft.

31. A method according to claim 25 further comprising displaying the entertainment related data from the at least one entertainment source on the plurality of displays.

32. A method according to claim 25 wherein the geographic areas are further selected by user entry of at least one of a zip code and an area code.

33. A method according to claim 25 wherein the satellite weather information receiver operates within a frequency range of about 1 to 3 GHz.

34. A method according to claim 25 wherein the at least one entertainment source comprises a satellite television (TV) receiver.

35. A method according to claim 34 wherein the satellite TV receiver comprises a direct broadcast satellite (DBS) receiver.

* * * * *

UNITED STATES PATENT AND TRADEMARK OFFICE
CERTIFICATE OF CORRECTION

PATENT NO. : 7,587,733 B2
APPLICATION NO. : 10/429115
DATED : September 8, 2009
INVENTOR(S) : Keen et al.

It is certified that error appears in the above-identified patent and that said Letters Patent is hereby corrected as shown below:

| | |
|---|---|
| Column 2, Line 62 | Delete: "Barron" Insert: --Baron-- |
| Column 6, Line 41 | Delete: "the-first" Insert: --the first-- |
| Column 9, Line 38 | Delete: "IFT" Insert: --IFI-- |
| Column 12, Line 58 | Delete: "of" Insert: --Of-- |
| Column 16, Line 38 | Delete: "may installed" Insert: --may be installed-- |
| Column 19, Line 64 | Delete: "appreciate" Insert: --appreciated-- |

Signed and Sealed this

Twenty-eighth Day of September, 2010

David J. Kappos
*Director of the United States Patent and Trademark Office*